(12) United States Patent
Fukushima et al.

(10) Patent No.: US 10,727,625 B2
(45) Date of Patent: Jul. 28, 2020

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Koichiro Mochizuki, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 21 days.

(21) Appl. No.: 16/030,102

(22) Filed: Jul. 9, 2018

(65) Prior Publication Data
US 2019/0058282 A1  Feb. 21, 2019

(30) Foreign Application Priority Data
Aug. 17, 2017 (JP) ................. 2017-157397

(51) Int. Cl.
*H01M 2/00* (2006.01)
*H01R 13/60* (2006.01)
(Continued)

(52) U.S. Cl.
CPC .......... *H01R 13/60* (2013.01); *H01M 2/1077* (2013.01); *H01M 2/206* (2013.01);
(Continued)

(58) Field of Classification Search
CPC .......... H01M 10/0525; H01M 2/1077; H01M 2220/20; H01M 2/206; H01R 2101/00; H01R 13/60; H01R 24/20
See application file for complete search history.

(56) References Cited

U.S. PATENT DOCUMENTS

| 2015/0194742 A1* | 7/2015 | Shigezane | ............ H01R 13/501 439/395 |
| 2016/0172652 A1* | 6/2016 | Ichikawa | ............... H01M 2/206 429/121 |

FOREIGN PATENT DOCUMENTS

JP    2016-009646    1/2016

* cited by examiner

*Primary Examiner* — Cynthia H Kelly
*Assistant Examiner* — Monique M Wills
(74) *Attorney, Agent, or Firm* — Greenblum & Bernstein, P.L.C.

(57) ABSTRACT

Provided is a wiring module with which there is no risk that a connector will interfere with other components in a state in which the connector is not connected to an external device. A wiring module to be attached to a power storage element group in which a plurality of power storage elements are lined up includes a bus bar for electrically connecting the plurality of power storage elements together, an insulating protector that accommodates the bus bar and is to be mounted onto the power storage element group, a wire that extends from the bus bar to the outside of the insulating protector, a connector that is provided at an extending end portion of the wire, the extending end portion extending from the insulating protector, and a connector holder that is provided in the insulating protector and detachably holds the connector.

13 Claims, 21 Drawing Sheets

(51) Int. Cl.
    *H01M 2/20*         (2006.01)
    *H01M 2/10*         (2006.01)
    *H01M 10/0525*    (2010.01)
    H01R 24/20       (2011.01)
    H01R 101/00     (2006.01)

(52) U.S. Cl.
    CPC .... *H01M 10/0525* (2013.01); *H01M 2220/20* (2013.01); *H01R 24/20* (2013.01); *H01R 2101/00* (2013.01)

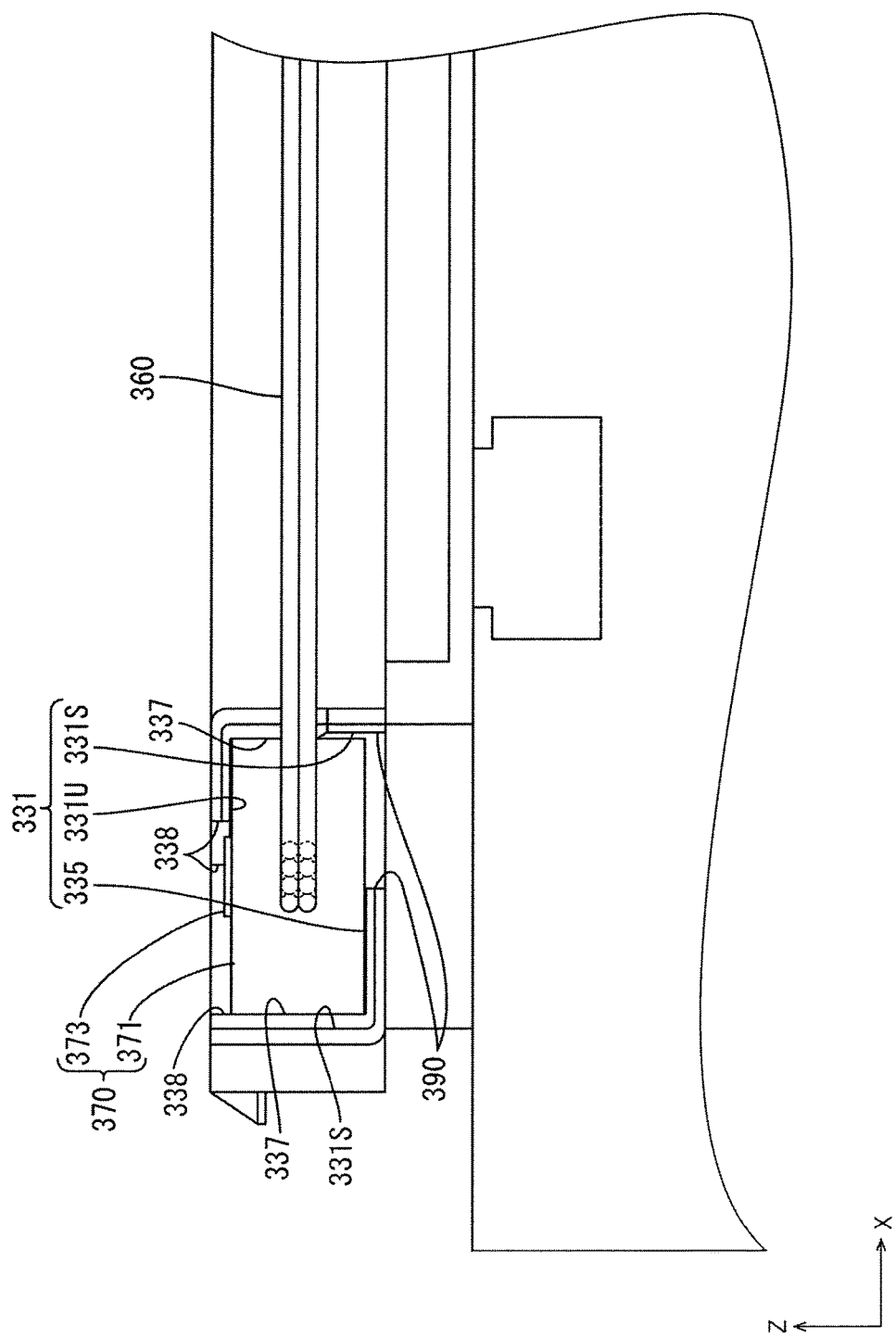

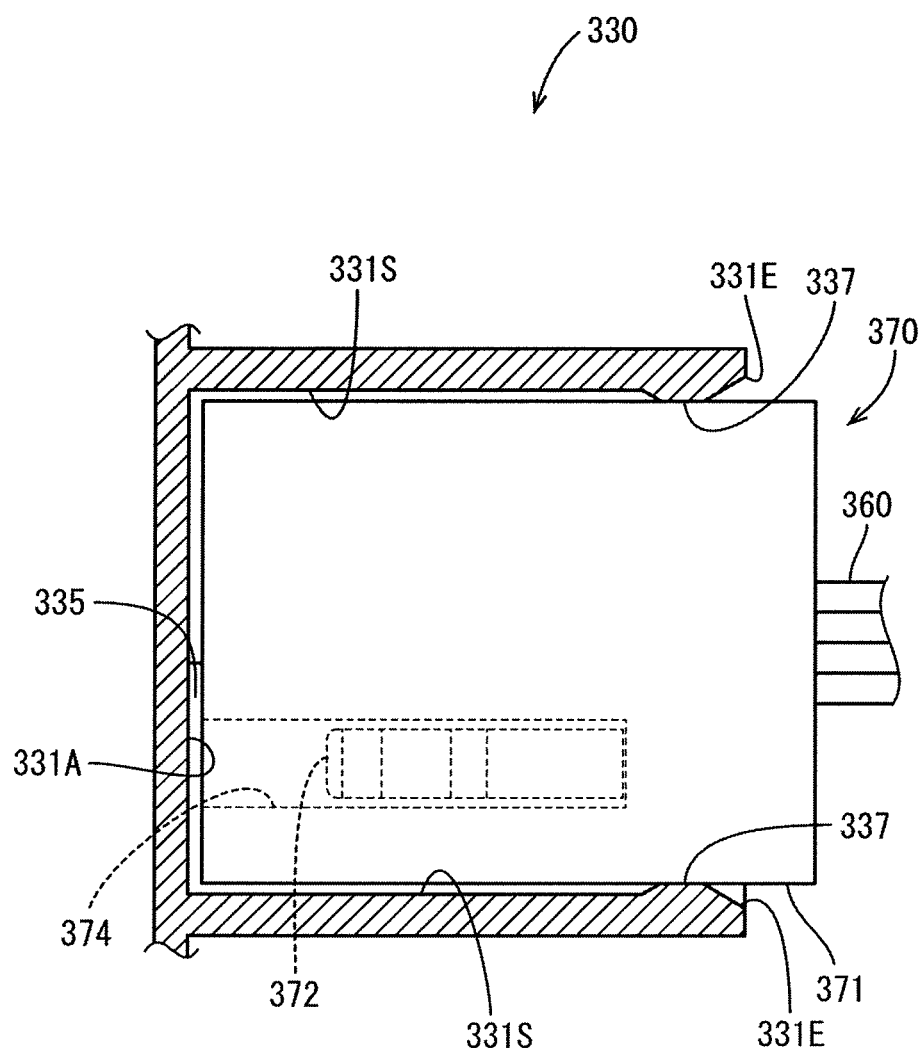
[FIG21]

WIRING MODULE

TECHNICAL FIELD

The present invention relates to a wiring module.

BACKGROUND ART

Conventionally, a wiring module that is disclosed in JP 2016-9646A and that is to be mounted on a power storage unit including a plurality of power storage elements in order to connect the power storage elements to one another is known. In this wiring module, a plurality of bus bars are accommodated in a resin protector, wires extending from the respective bus bars are collected into a bundle and extend from one end side of the resin protector, and a connector for connection to an external device is disposed at a leading end of the wire bundle.

JP 2016-9646A is an example of related art.

However, with this configuration, in a state in which the connector is not connected to an external device, the connector dangles from the leading end of the wires outside the resin protector, and thus there is a risk that the connector will interfere with other components. To prevent this problem, for example, a method of temporarily holding the connector to the resin protector using a piece of pressure-sensitive adhesive tape or the like is conceivable.

In this case, however, it takes time and effort to remove the pressure-sensitive adhesive tape when connecting the connector to an external device, and furthermore, the removed pressure-sensitive adhesive tape may become waste, which may hinder the connecting operation.

The technology disclosed in the present specification has been accomplished based on the above-described circumstances, and it is an object thereof to provide a wiring module with which there is no risk that a connector will interfere with other components in a state in which the connector is not connected to an external device.

SUMMARY OF THE INVENTION

A wiring module according to the technology disclosed in the present specification is a wiring module to be attached to a power storage element group in which a plurality of power storage elements are lined up, the wiring module including a bus bar for electrically connecting the plurality of power storage elements together, an insulating protector that accommodates the bus bar and is to be mounted onto the power storage element group, a wire that extends from the bus bar side to the outside of the insulating protector, a connector that is provided at an extending end portion of the wire, the extending end portion extending from the insulating protector, and a connector holder that is provided in the insulating protector and detachably holds the connector.

With this configuration, since the connector can be detachably held in the connector holder, the connector can be prevented from dangling from the extending end portion of the detection wire and interfering with other components.

The following configurations are preferred as embodiments of the technology disclosed in the present specification.

(1) The connector may be provided with an elastic piece that is flexible in a direction that crosses an insertion direction of the connector, and the connector holder may be provided with a holding opening in which the elastic piece is held in a state in which the connector is held in the connector holder, and an internal tapered surface that is contiguous with the holding opening and that slides against the elastic piece and bends the elastic piece as the connector is removed from the connector holder.

With this configuration, the connector is held in the connector holder by the elastic piece of the connector being locked to the holding opening, and, while the connector is being removed from the connector holder, the elastic piece of the connector is gradually bent while sliding against the internal tapered surface. Therefore, the connector can be detached from the connector holder by merely pulling the connector, and it is easy to perform the detaching operation.

(2) The connector holder may include a protruding wall portion, the protruding wall portion protruding in a direction that crosses an insertion direction of the connector, and a protruding end portion of the protruding wall portion being configured to press against the connector.

With this configuration, since the housing of the connector is pressed against by the protruding wall portion, when compared with, for example, a case without the protruding wall portion, the connector is less likely to slip out of the connector holder even if the wiring module is tilted, for example. Moreover, since the connector can be held simply by providing the protruding wall portion in the connector holder, the structure of the connector holder and the pulling-out operation can be simplified.

(3) The connector holder may include a disengagement preventing portion to be locked to a rear end portion of the connector inserted into the connector holder, from a rear side to thereby prevent the connector from disengaging from the connector holder, and a projecting piece that is contiguous with the disengagement preventing portion and with which a locking state realized by the disengagement preventing portion can be released.

With this configuration, since the disengagement preventing portion is locked to the rear end portion of the connector from the rear side, the connector can be prevented from disengaging from the connector holder. Moreover, when the connector is to be pulled out from the connector holder, a state in which the connector can be pulled out from the holding recess can be created by operating the projecting piece. Therefore, even when, for example, a worker wears thick gloves or the like, the worker can operate the projecting piece with thick gloves on, and it is easy to perform the pulling-out operation.

(4) The protruding wall portion may be provided in a portion of the connector holder with respect to the insertion direction of the connector.

If the protruding wall portion is formed in, for example, a shape that extends in the insertion direction of the connector, it is necessary to precisely manage the dimensions over the entire region in the insertion direction of the connector in order to obtain an appropriate pressing force against the connector. In contrast, with the above-described configuration, since the protruding wall portion is provided in a portion of the connector holder with respect to the insertion direction of the connector, it is sufficient that merely the dimensions of this portion are precisely managed, and therefore, manufacturing is made easier.

(5) The connector holder may include a receiving port for receiving the connector, and the protruding wall portion may be disposed in the vicinity of the receiving port.

With this configuration, since the protruding wall portion is disposed in the vicinity of the receiving port, when compared with, for example, a case where the protruding wall portion is provided in the inner side of the connector holder or a case where the connector is pressed against by the entire connector holder, the connector holder itself is more easily elastically expanded and deformed, and accordingly, the connector is more easily inserted.

(6) The insulating protector may have a wire outlet port through which the wire extends to the outside, the wire outlet port being formed in a single wall portion of the insulating protector, and the connector holder may be provided at an end portion of the single wall portion that is away from the wire outlet port.

With this configuration, since the connector holder is provided in the same single wall portion as the wire outlet port and is provided at the end portion of that wall portion that is away from the wire outlet port, the bend radius of the wire extending from the wire outlet port and bent toward the connector holder can be increased. Thus, the reaction force of the wire against bending decreases, and it is easy to perform the operation of assembling the connector, which is provided at the extending end portion of the wire, to the connector holder.

(7) The insulating protector may have a wire outlet port through which the wire extends to the outside, and the connector holder may be provided adjacent to the wire outlet port.

With this configuration, the bend radius of the wire extending from the wire outlet port and bent toward the connector holder can be reduced. Accordingly, the area occupied by the wire outside the insulating protector can be reduced, and space can be saved.

(8) The connector may include an insertion opening into which a mating terminal is to be inserted and a terminal that is provided inside the insertion opening, and the connector holder may isolate the insertion opening from an external space.

With this configuration, since the insertion opening of the connector is isolated from the external space in a state in which the connector is held in the connector holder, the worker or a tool can be prevented from erroneously coming into contact with the terminal. Note that the wording "isolated from an external space" is not limited to a configuration in which the insertion opening is entirely shielded, and, for example, may also refer to a configuration in which a gap is provided between the insertion opening and an inner surface of the connector holder that opposes the insertion opening or may also refer to a configuration in which only a portion of the insertion opening is covered, and the other portions are exposed to the external space. In short, it is sufficient that the connector holder is disposed between the external space and the insertion opening to such an extent that a finger of the worker, a tool, or the like can be prevented from being erroneously inserted into the insertion opening.

(9) When a direction in which the connector is inserted into the connector holder is defined as an insertion direction, the wire may be led out from the connector in a direction opposite to the insertion direction.

With this configuration, since the space that is occupied by the wire extending from the connector holder can serve as the space that is required for insertion of the connector into the connector holder, it is no longer necessary for the space that is required for insertion of the connector 70 into the holding recess 31 to be provided by design, and space can be saved accordingly.

(10) When the direction in which the connector is inserted into the connector holder is defined as the insertion direction, the insertion direction may cross a direction in which the insulating protector is separated from the power storage element group.

With this configuration, since the connector is pulled out from the connector holder in the direction that crosses the direction in which the insulating protector is separated from the power storage element group, while the connector is being pulled out from the connector holder, the connection state between a connecting conductor and an electrode is not affected.

According to the technology disclosed in the present specification, it is possible to provide a wiring module with which there is no risk that a connector will interfere with other components in a state in which the connector is not connected to an external device.

BRIEF DESCRIPTION OF THE DRAWINGS

FIG. 20 is a rear view showing the insulating protector;
and
FIG. 21 is a cross-sectional view of the insulating protector.

EMBODIMENTS OF THE INVENTION

Embodiment 1

Figure 1:
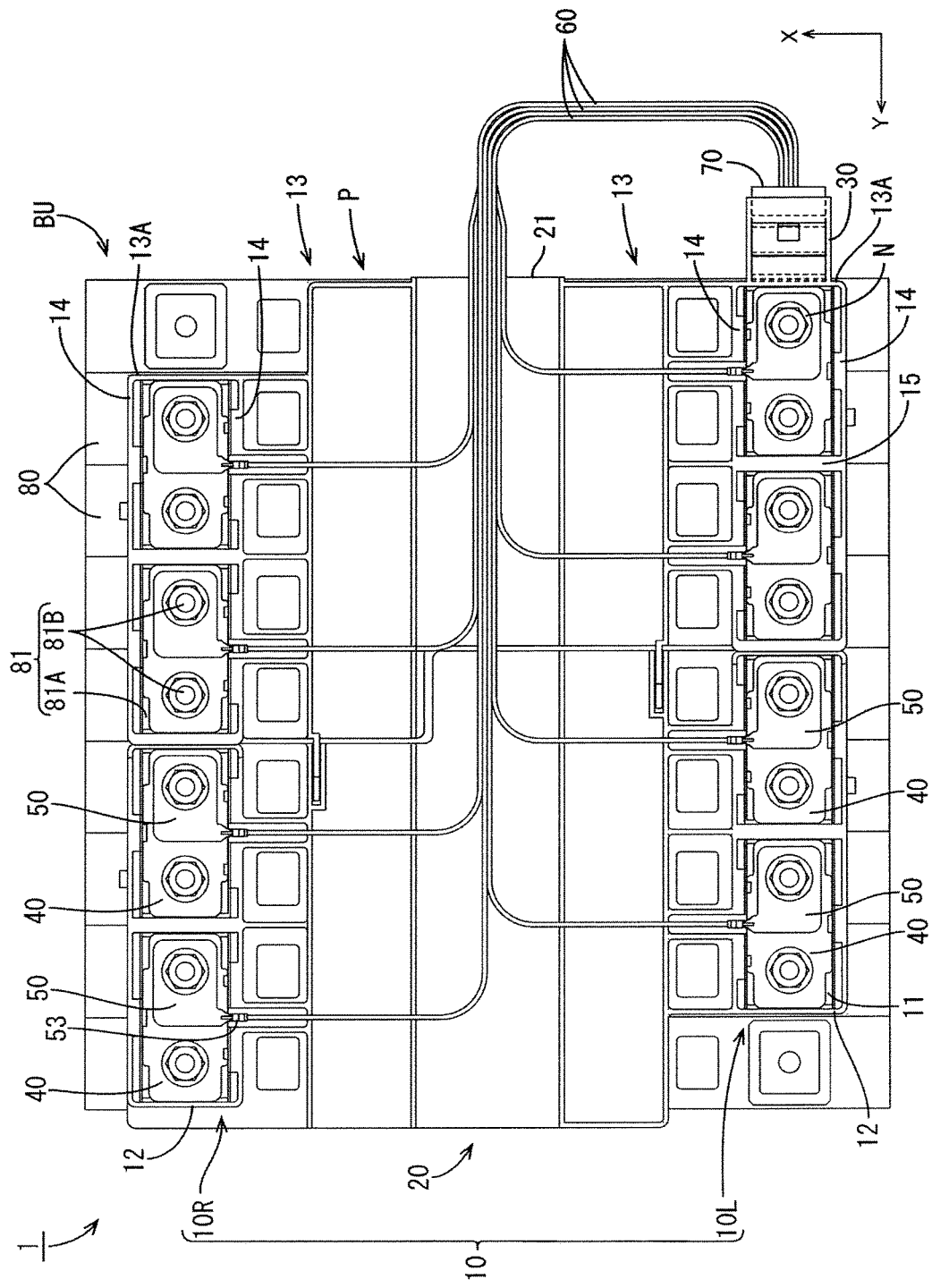
FIG. 1 is a top view showing a wiring module of Embodiment 1.

Embodiment 1 according to the technology disclosed in the present specification will be described with reference to FIGS. 1 to 6.

A wiring module 1 of the present embodiment is mounted to a power storage element group BU in which a plurality of power storage elements 80 such as lithium-ion batteries are lined up. The power storage element group BU is to be installed in a vehicle, such as an electric automobile or a hybrid automobile, and used as a driving power source. In the following description, a direction Y in the drawings is taken as the front side, a direction X as the right side, and a direction Z as the upper side. Also, in the following description, there are cases where only one of a plurality of identical members is denoted by a reference numeral, while the reference numeral is omitted with respect to the other members.

The power storage element group BU includes the plurality of power storage elements 80 that are lined up in a single row in a front-rear direction such that positive electrodes alternate with negative electrodes. Each of the power storage elements 80 includes a flat rectangular parallelepiped-shaped main body portion in which a power storage component is accommodated and electrodes 81. The electrodes 81 each include a rectangular column portion 81A that protrudes from the main body portion and a cylindrical portion 81B which protrudes from the rectangular column portion 81A and around which a screw groove is formed. The power storage elements 80 are arranged with the electrodes 81 being lined up on the upper side, and are electrically connected to one another by bus bars 40, which will be described later. Note that the power storage elements 80 may be any of batteries, capacitors, and fuel cells.

As shown in FIG. 1, the wiring module 1 is constituted by an insulating protector P, a plurality of bus bars 40, a plurality of detection wires 60, a plurality of detection terminals 50, a connector 70, and a connector holder 30. As will be described later, the connector holder 30 is integrally provided in the insulating protector P.

The insulating protector P is made of a synthetic resin material having insulating properties, and has an overall vertically flat, parallelepiped shape. As shown in FIG. 1, the insulating protector P includes terminal fitting accommodating portions 10 that accommodate the bus bars 40, a wire accommodating portion 20 that accommodates the detection wires 60 extending from the bus bars 40, and a rear wall 13 (an example of a single wall portion) that is provided at a rear end of the insulating protector P, and the insulating protector P is mounted on the upper side of the power storage element group BU.

Figure 2:
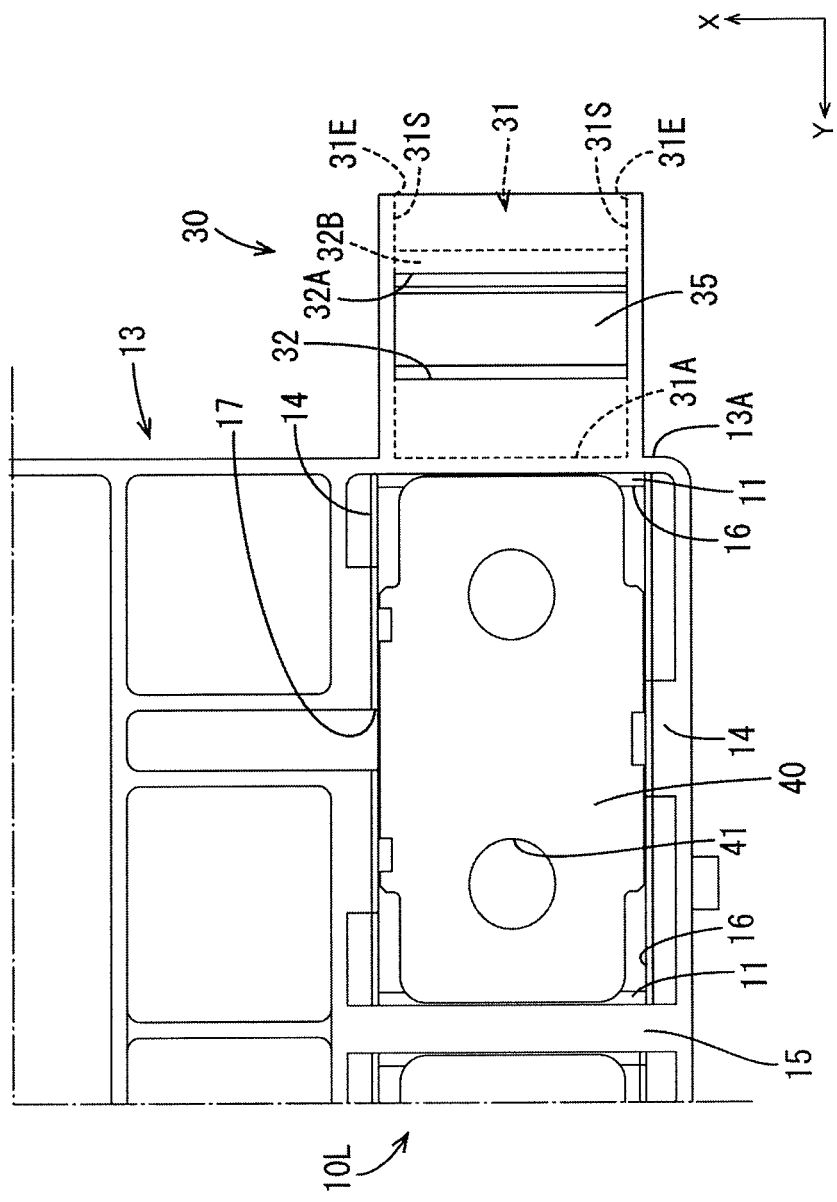
FIG. 2 is a top view showing an insulating protector and a bus bar.

As shown in FIG. 1, the terminal fitting accommodating portions 10 are provided on the left and right sides, respectively, of the insulating protector P, and each of the terminal fitting accommodating portions 10 includes mount surfaces 11 onto which the corresponding bus bars 40 are mounted, a front wall 12, a rear wall 13, and left and right side walls 14. Terminal fitting accommodating portions 10R and 10L are each partitioned into a plurality of sections that are lined up in the front-rear direction, by a plurality of partition walls 15 that extend in a left-right direction. As shown in FIG. 2, a pair of electrode insertion holes 16 lined up in the front-rear direction are provided in the mount surface 11 in each section. The electrode insertion holes 16 penetrate the mount surface 11 in an up-down direction and each have a rectangular shape that is slightly larger than the rectangular column portion 81A of each electrode 81 of the power storage elements 80. The rectangular column portions 81A of the electrodes 81 are inserted in and protrude upward from the respective electrode insertion holes 16. In each of the terminal fitting accommodating portions 10, the electrode insertion holes 16 are lined up in a straight line in the front-rear direction.

Figure 3:
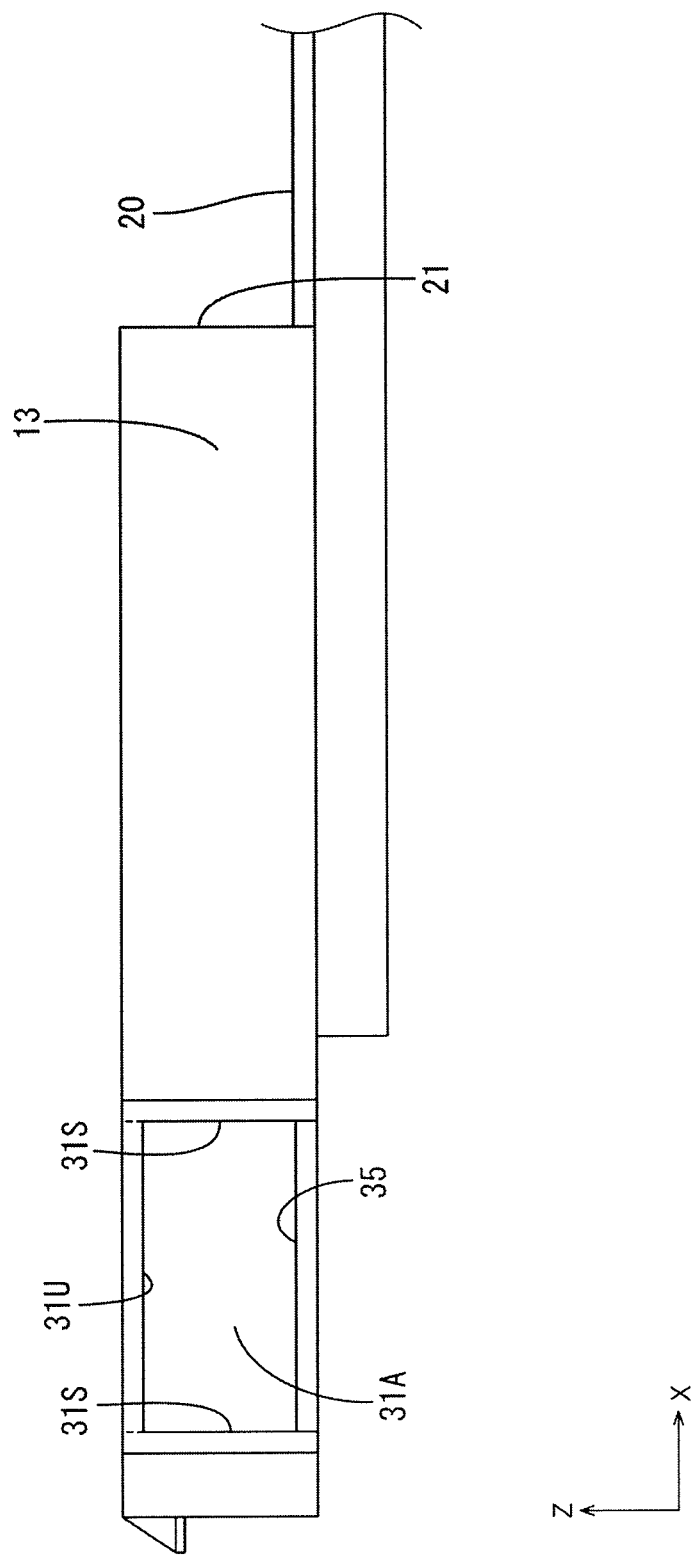
FIG. 3 is a rear view showing the insulating protector.

The wire accommodating portion 20 is provided between the two terminal fitting accommodating portions 10R and 10L, and, as shown in FIGS. 1 and 3, is formed in a rectangular trough-like shape that extends from the front end to the rear end of the insulating protector P. Note that the side wall 14 of each terminal fitting accommodating portion 10 that faces the wire accommodating portion 20 has a communication opening 17 for each section, the communication opening 17 having a shape that is cut out from above.

Each of the bus bars 40 is formed of, for example, a conductive metal plate made of copper, a copper alloy, aluminum, an aluminum alloy, or the like, and, as shown in FIG. 2, has a rectangular shape that is elongated in the front-rear direction. Through holes 41 each having a circular shape or an oval shape elongated in the front-rear direction are provided in the vicinity of front and rear ends, respectively, of each bus bar 40, the through holes 41 penetrating the bus bar 40 in the up-down direction.

The bus bars 40 are accommodated in the respective sections of the terminal fitting accommodating portions 10 in a state in which the bus bars 40 are mounted on the rectangular column portions 81A, with the cylindrical portions 81B of the electrodes 81 being inserted in the respective through holes 41, and are fixed by fastening nuts N to the respective cylindrical portions 81B from above. That is to say, the bus bars 40 are attached to the power storage elements 80 from above via the insulating protector P, and are configured such that, if the insulating protector P is separated upward from the power storage elements 80, the bus bars 40 are disconnected from the power storage elements 80. A minimal clearance for accommodating the bus bars 40 in the respective sections is left between each bus bar 40 and each of the partition walls 15 and the side walls 14 of a corresponding one of the sections.

Figure 4:
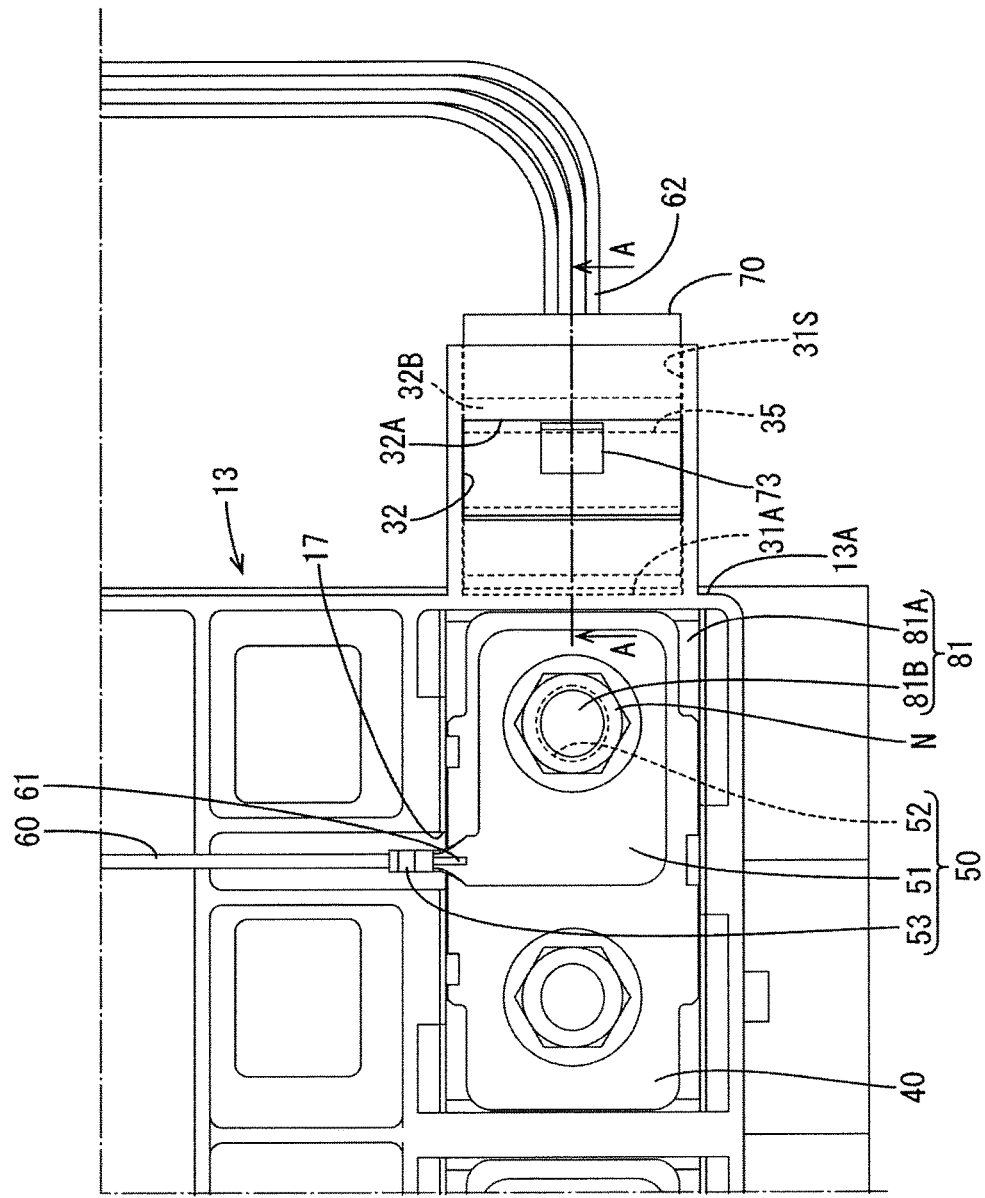
FIG. 4 is a top view showing the wiring module.

The terminal fitting accommodating portions 10 each further accommodate the detection terminals 50 formed of a thin metal material. As shown in FIG. 4, the detection terminals 50 each include a terminal main body 51, a hole portion 52 provided in the terminal main body 51 and having approximately the same dimensions as the through holes 41 of the bus bars 40, and a crimp portion 53 extending from the terminal main body 51. The terminal main body 51 is laid on a corresponding one of the bus bars 40, the electrode 81 (cylindrical portion 81B) protruding from one of the through holes 41 of the bus bar 40 is inserted in the hole portion 52, and the crimp portion 53 extends from the communication opening 17 of each section toward the wire accommodating portion 20.

The nut N is screwed from above onto the electrode 81 (cylindrical portion 81B) protruding from the hole portion 52 of the detection terminal 50 and presses the detection terminal 50 from above. Thus, the bus bar 40 and the detection terminal 50 are electrically connected to the electrode 81 in a state in which the bus bar 40 and the detection terminal 50 are suppressed from being displaced in a direction (upward) in which the electrical connection would be interrupted.

Each of the detection wires 60 is an insulated wire in which the periphery of a conductor portion is covered by an insulating coating (insulating layer), and is crimped to the crimp portion 53 of the detection terminal 50 at one end 61 where the insulating coating has been stripped off. The detection wire 60 extending from the crimp portion 53 of the detection terminal 50 is bent rearward within the wire accommodating portion 20, as shown in FIG. 1, and extends outward through a wire outlet port 21 that is formed at the center of the rear wall 13 of the wire accommodating portion 20 with respect to the left-right direction. Note that although a state in which the insulating coatings of the detection wires 60 extending from the insulating protector P are exposed is schematically shown in the drawings, the detection wires 60 extending from the insulating protector P may also be bundled together and collectively covered with a protective member.

Figure 5:
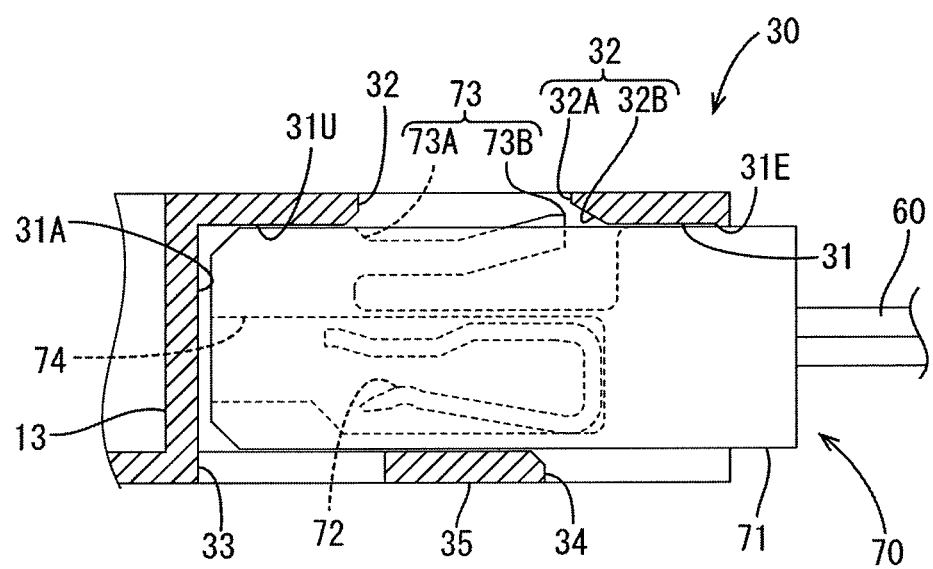
FIG. 5 is a cross-sectional view taken along line A-A in FIG. 4.
Figure 6:
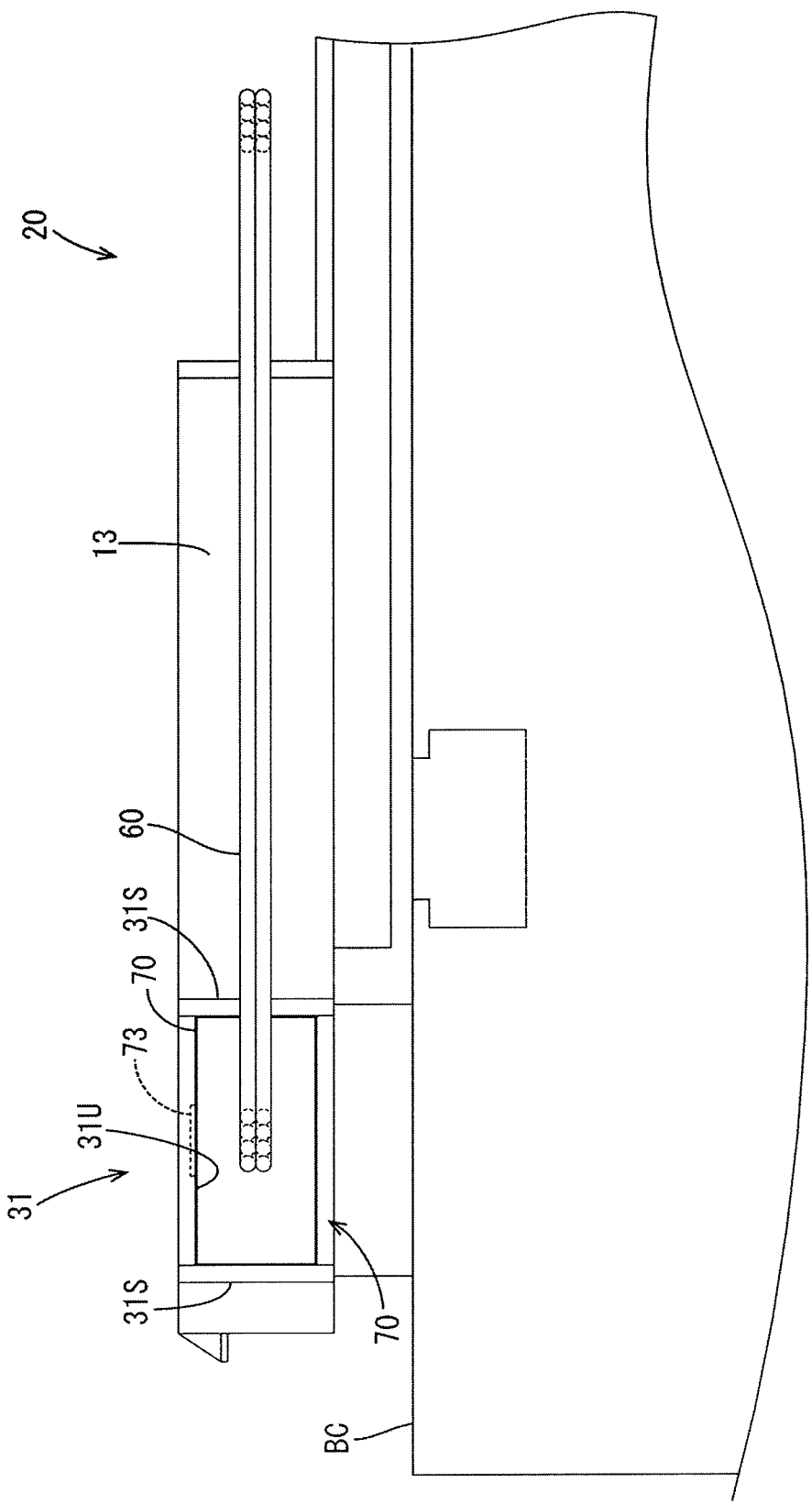
FIG. 6 is a rear view showing the wiring module.

As shown in FIGS. 1 and 6, the connector 70 is provided at extending end portions 62 (end portions on a side that extends outward through the wire outlet port 21 of the insulating protector P) of the detection wires 60. As shown in FIG. 5, the connector 70 includes a flat parallelepiped-shaped housing 71, a female terminal 72, and an elastic piece 73. The housing 71 has an insertion opening 74 that opens forward, and a forward direction is the direction in which the housing 71 is inserted into a holding recess 31. Moreover, the detection wires 60 are led out from a rear portion of the housing 71. The female terminal 72 is disposed within the insertion opening 74 and is connected to the detection wires 60 (extending end portions 62) within the housing 71. The elastic piece 73 has a cantilever spring-like shape with the front end of the elastic piece 73 serving as a base end 73A, and the rear end thereof that protrudes obliquely upward serving as a free end 73B, and the elastic piece 73 is provided on an upper surface side of the housing 71. The base end 73A is disposed below the upper surface of the housing 71. The free end 73B protrudes upward above the upper surface of the housing 71, and is flexible in a downward direction (direction that crosses the insertion direction into the connector holder 30).

Note that the connector 70 is a connector to be connected to an external ECU (Electronic Control Unit), which is not shown. The ECU incorporates a microcomputer, an electronic component, and the like and has a well-known configuration including the functions for detecting the voltage, current, temperature, and the like of the power storage elements 80, controlling charge and discharge of the power storage elements 80, and so on. The connector 70 is configured to be locked to a mating connector, which is not shown, in a mutually fitted state by the elastic piece 73 of the connector 70 being locked to a locking portion provided on that mating connector, and to be connected to the mating connector by a mating terminal, which is not shown, being inserted into the insertion opening 74.

As described above, the insulating protector P is provided with the connector holder 30 for holding the connector 70 in a state in which it is not connected to a mating connector. As shown in FIGS. 1 to 5, the connector holder 30 having a vertically flat parallelepiped shape is integrally formed with the insulating protector P and protrudes rearward from a rear wall 13A (end portion 13A, of the rear wall 13 of the insulating protector P, that is away from the wire outlet port 21) of the left terminal fitting accommodating portion 10L.

The connector holder 30 includes a holding recess 31 that opens rearward (in a direction horizontally away from the insulating protector P) and also includes an upper opening 32, a first access hole 33, and a second access hole 34.

The holding recess 31 is disposed such that the center line of the holding recess 31 with respect to the left-right direction is located on the same line as a straight line that connects the axes of the cylindrical portions 81B of the power storage elements 80 that are inserted in the terminal fitting accommodating portion 10L. The height of the holding recess 31 is approximately the same as the height of the housing 71 of the connector 70. The depth (length in the front-rear direction) of the holding recess 31 is smaller than the dimension of the connector 70 in the front-rear direction. Note that the opening of the holding recess 31 constitutes a receiving port 31E for receiving the connector 70. That is to say, while a configuration is adopted in which the bus bars 40 are disconnected from the power storage elements 80 as a result of the insulating protector P being separated upward from the power storage elements 80, in the connector holder 30, the direction that is orthogonal to the direction in which the insulating protector P is separated from the power storage element group BU is the insertion direction of the connector 70.

The upper opening 32 (an example of a holding opening) is formed by making a rectangular opening at the center of a holding upper surface 31U of the connector holder 30 with respect to the front-rear direction, and brings a central portion of an internal space of the holding recess 31 into communication with a space above the holding recess 31 over the entire width of the upper opening 32. An opening rear edge of the upper opening 32 includes a vertical surface 32A and an internal tapered surface 32B that is contiguous with the vertical surface 32A and that has a shape obtained by obliquely cutting off an internal space side portion of the holding recess 31 and slopes downward from the front side to the rear side. The height from the lower end of the vertical surface 32A (upper end of the internal tapered surface 32B) to the upper surface of a support plate portion 35 in a side view is larger than the height of the entire connector 70 including the elastic piece 73.

The first access hole 33 is formed by making a portion on the front side (side that is near the terminal fitting accommodating portion 10L) of the connector holder 30 open downward, and brings the internal space of the holding recess 31 into communication with a space below. The second access hole 34 is formed by making a portion on the rear end (side that is away from the terminal fitting accommodating portion 10L) of the connector holder 30 open downward, and brings the internal space of the holding recess 31 into communication with the space below. In other words, the holding recess 31 has a shape that opens downward except for the support plate portion 35 that connects opposite holding side surfaces 31S to each other at the center with respect to the front-rear direction.

The connector 70 is supported by the support plate portion 35, and is held in the holding recess 31 in a state in which displacement of the connector 70 in the upward direction, the lateral directions, and the forward direction is restricted by the holding upper surface 31U, the opposite holding side surfaces 31S, and a holding inner surface 31A (i.e., external surface of the rear wall 13A of the terminal fitting accommodating portion 10) of the holding recess 31, and displacement of the connector 70 in the rearward direction is restricted by the free end 73B of the elastic piece 73 abutting against or opposing the internal tapered surface 32B of the upper opening 32.

In this state, the holding inner surface 31A of the holding recess 31 abuts against or opposes an opening end portion of the insertion opening 74 and isolates the insertion opening 74 from an external space. Moreover, in this state, as shown in FIGS. 1 and 6, the detection wires 60 extending from the insulating protector P are disposed within the range of the thickness of the insulating protector P when viewed in a horizontal direction, and are held in a state in which the detection wires 60 are bent by a total of 180 degrees in a top view.

Note that the wording "isolated from an external space" is not limited to a configuration in which the insertion opening is entirely shielded, and, for example, may also refer to a configuration in which a gap is provided between the insertion opening and the holding inner surface or may also refer to a configuration in which only a portion of the insertion opening is covered, and the other portions are exposed to the external space. In short, it is sufficient that the holding recess 31 is disposed between the external space and the insertion opening to such an extent that a finger of a worker or a tool can be prevented from being erroneously inserted into the insertion opening.

In order for the connector 70 to be held in the connector holder 30, the opening of the insertion opening 74 of the connector 70 opposes the receiving port 31E of the holding recess 31 of the connector holder 30, and the connector 70 is moved toward the holding inner surface 31A (forward side) of the holding recess 31 while moving the upper surface and the opposite side surfaces of the connector 70 along the holding upper surface 31U and the left and right holding side surfaces 31S, respectively, of the holding recess 31. Then, the elastic piece 73 of the connector 70 moves into the holding recess 31 in a state in which the elastic piece 73 is pressed down by the holding upper surface 31U of the holding recess 31 sliding against the elastic piece 73. After that, the free end 73B elastically returns upward along the internal tapered surface 32B of the upper opening 32, and is ultimately fully elastically returned and abuts against or opposes the internal tapered surface 32B. Thus, the elastic piece 73 is disposed below the upper end of the upper opening 32. Simultaneously, the opening end portion of the insertion opening 74 of the connector 70 abuts against the holding inner surface 31A of the holding recess 31 from the rear side and is thus isolated from the external space. As a result, the connector 70 is held in the holding recess 31.

To detach the connector 70 from the connector holder 30, a tool or the like is inserted into the upper opening 32 of the connector holder 30 to push the elastic piece 73 downward. Meanwhile, the rear end of the connector 70 that is exposed from the holding recess 31 is gripped and pulled rearward. At this time, the connector 70 may also be displaced rearward by further inserting a tool between the holding inner surface 31A of the holding recess 31 and the connector 70 through the first access hole 33 and, for example, prizing out the connector 70. Then, after the elastic piece 73 has been displaced to the rear of the vertical surface 32A of the upper opening 32, the elastic piece 73 slides against the internal tapered surface 32B of the holding recess 31 and the holding upper surface 31U that is contiguous with the internal tapered surface 32B, thereby bending the elastic piece 73 downward. Then, when the connector 70 is further displaced rearward as is, the connector 70 is pulled out from the receiving port 31E of the holding recess 31, and is thus removed from the connector holder 30.

With the above-described configuration, the connector 70 can be detachably held in the connector holder 30, and therefore, the connector 70 can be prevented from dangling from the extending end portions of the detection wires 60 and interfering with other members.

Moreover, the connector 70 is held in the holding recess 31 by the elastic piece 73 of the connector 70 being locked to the holding opening 32, and while the connector 70 is being removed from the holding recess 31, the elastic piece 73 of the connector 70 is gradually bent while sliding against the internal tapered surface 32B. Therefore, the connector 70 can be detached from the holding recess 31 by simply pulling the connector 70, and it is easy to perform the detaching operation.

Moreover, since the connector holder 30 is provided in the same single wall portion 13 as the wire outlet port 21 and is also provided in the end portion 13A, of that wall portion 13, that is away from the wire outlet port 21, the bend radius of the wires 60 extending from the wire outlet port 21 and bent toward the connector holder 30 can be increased. Thus, the reaction force of the wires 60 against bending decreases, and it is easy to perform the operation of assembling the connector 70, which is provided at the extending end portions of the wires 60, to the connector holder 30.

Moreover, since the insertion opening 74 of the connector 70 is isolated from the external space in a state in which the connector 70 is held in the connector holding recess 31, it is possible to prevent the worker or a tool from erroneously coming into contact with the female terminal. Note that the wording "isolated from the external space" is not limited to a configuration in which the insertion opening is entirely shielded, and, for example, may also refer to a configuration in which a gap is provided between the insertion opening and the holding inner surface or may also refer to a configuration in which only a portion of the insertion opening is covered, and the other portions are exposed to the external space. In short, it is sufficient that the holding recess is disposed between the external space and the insertion opening to such an extent that a finger of the worker, a tool, and the like can be prevented from being erroneously inserted into the insertion opening.

Moreover, since the space that is occupied by the wires 60 extending from the connector holder 30 can serve as the space that is required for insertion of the connector 70 into the holding recess 31, it is no longer necessary for the space that is required for insertion of the connector 70 into the holding recess 31 to be provided by design, and space can be saved accordingly.

Moreover, since the connector 70 is pulled out from the connector holder 30 in the direction that crosses the direction in which the insulating protector P is separated from the power storage element group, while the connector 70 is being pulled out from the connector holder 30, the connection state between the detection terminals 50 and the electrodes 81 is not affected. This configuration is particularly effective in a case where, for example, the means for connecting the bus bars 40 and the detection terminals 50 to the rectangular column portions 81A of the electrodes 81 is relatively weak against a stripping force (e.g., a case where the connection is established through soldering or ultrasonic welding).

Moreover, since the connector 70 is locked in the connector holder 30 using the elastic piece 73 for locking to a locking portion of a mating connector, a configuration that eliminates the need to separately provide a locking mechanism is obtained.

Embodiment 2

Figure 7:
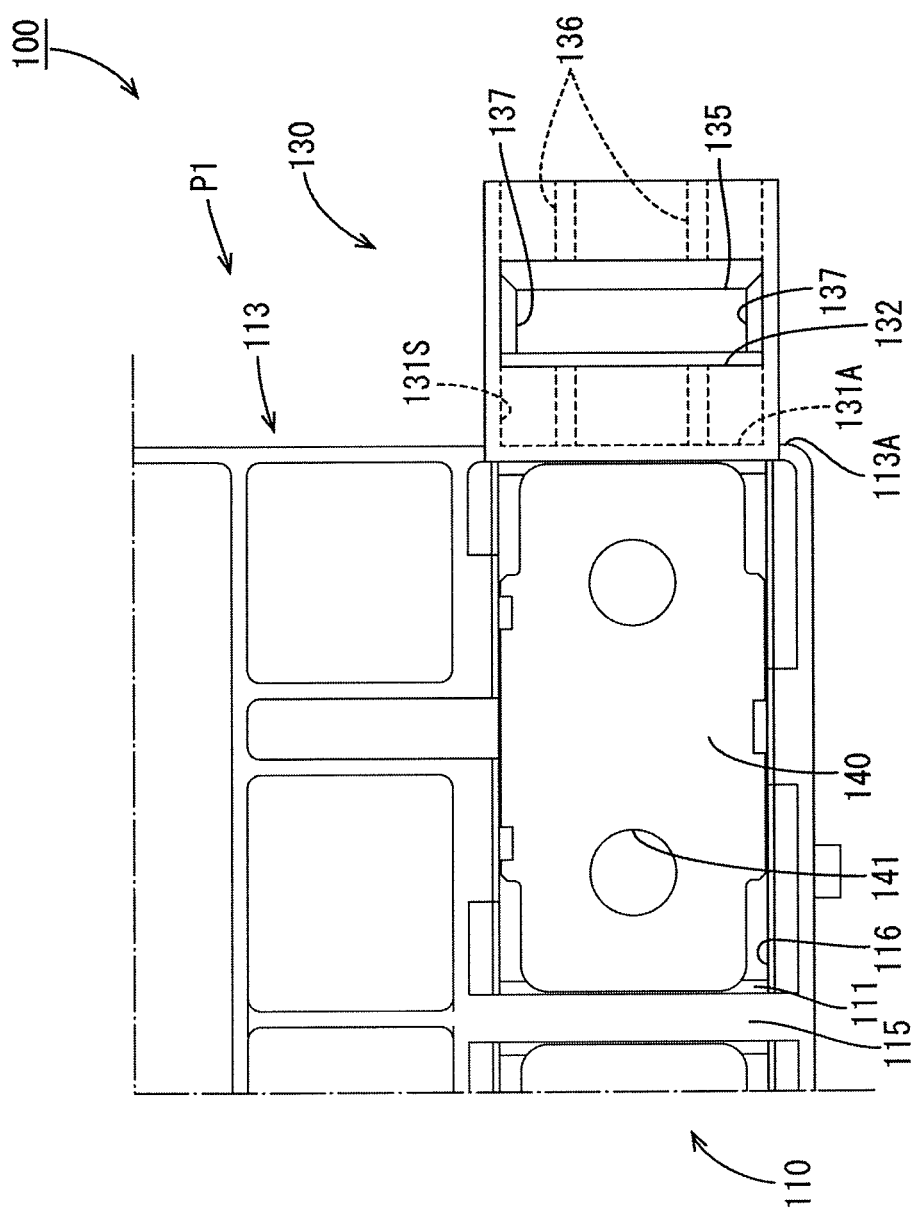
FIG. 7 is a top view showing an insulating protector and a bus bar of Embodiment 2.
Figure 8:
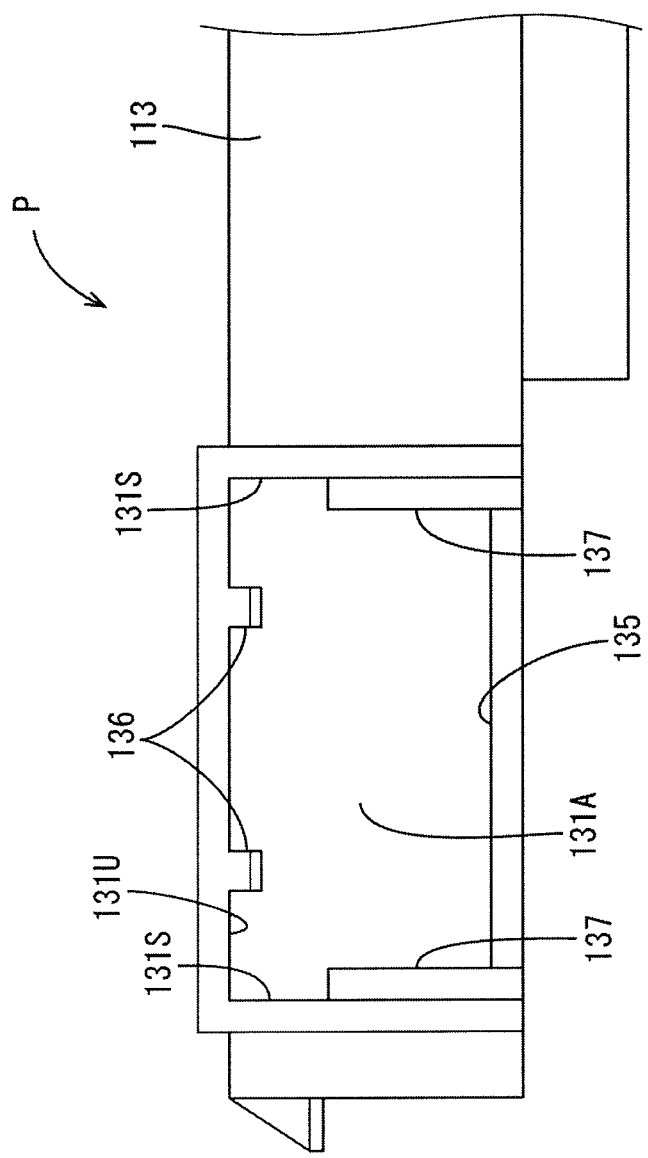
FIG. 8 is a rear view showing the insulating protector.

Next, Embodiment 2 according to the technology disclosed in the present specification will be described with reference to FIGS. 7 to 12. As shown in FIGS. 7 and 8, a wiring module 100 of the present embodiment includes a pair of ribs 136 and a pair of protruding wall portions 137 in a connector holder 130 of an insulating protector P1. Note that, in the present embodiment, the rear edge of an upper opening 132 is not provided with an internal tapered surface.

Each rib 136 protrudes downward (in a direction that crosses the protruding direction of the protruding wall portions 137) from a holding upper surface 131U of a holding recess 131 of the connector holder 130. The ribs 136 are provided at symmetrical positions on the holding upper surface 131U with respect to the center line of the holding upper surface 131U in the left-right direction, and extend from the front end to the rear end of the holding recess 131.

The protruding wall portions 137 protrude toward each other (i.e., in directions that cross the insertion direction of a connector 170) from respective central portions of opposite holding side surfaces 131S of the holding recess 131 in the front-rear direction, and each have a shape that is longer in the up-down direction than in the front-rear direction. In other words, the protruding wall portions 137 have shapes that are formed by bending the left and right ends of a support plate portion 135 upward along the opposite holding side surfaces 131S.

Figure 9:
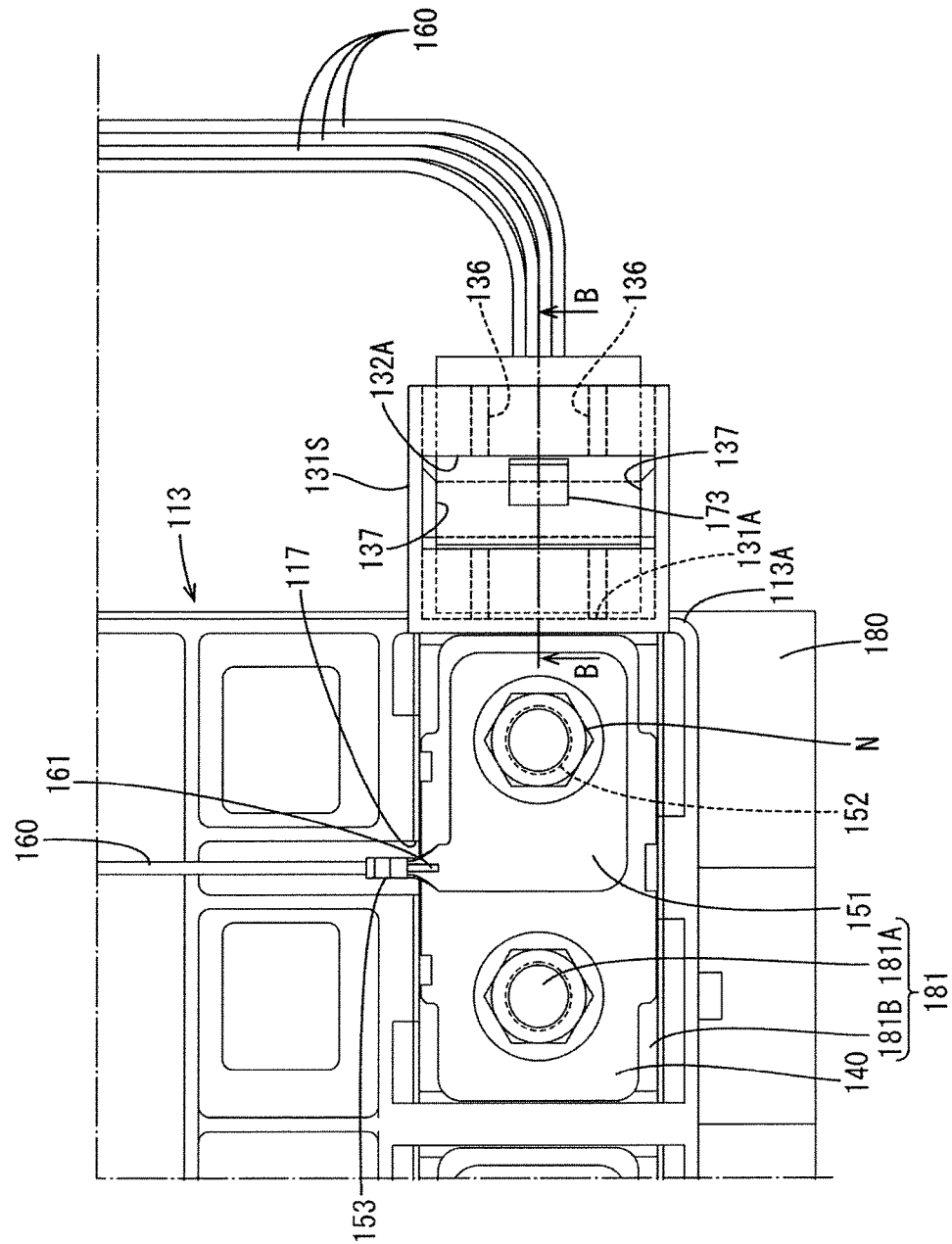
FIG. 9 is a top view showing a wiring module.
Figure 10:
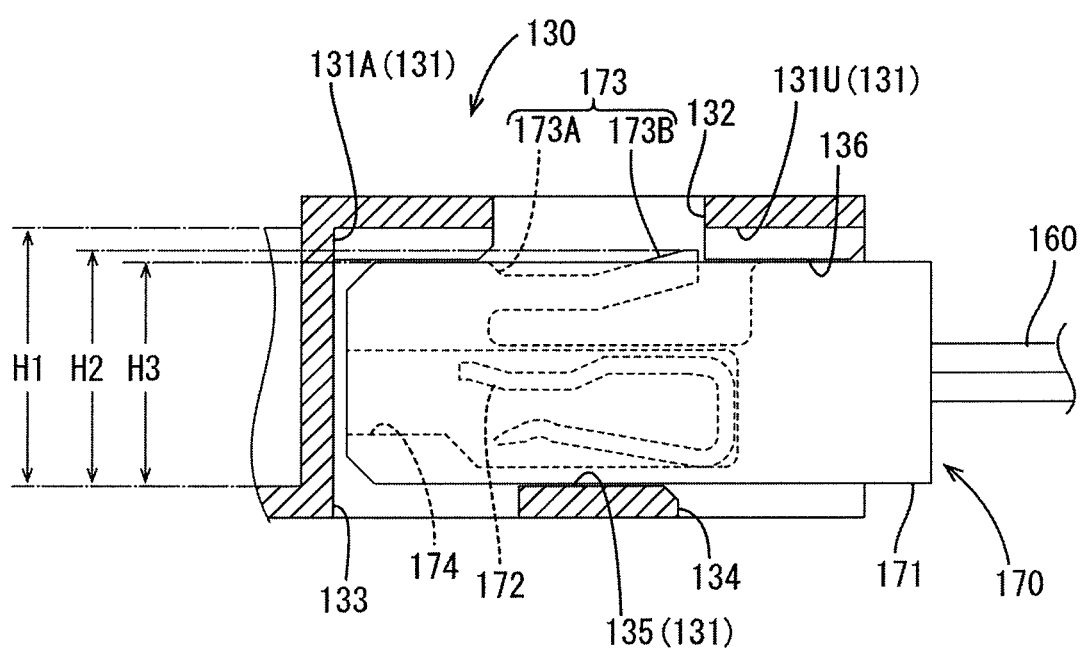
FIG. 10 is a cross-sectional view taken along line B-B in FIG. 9.
Figure 11:
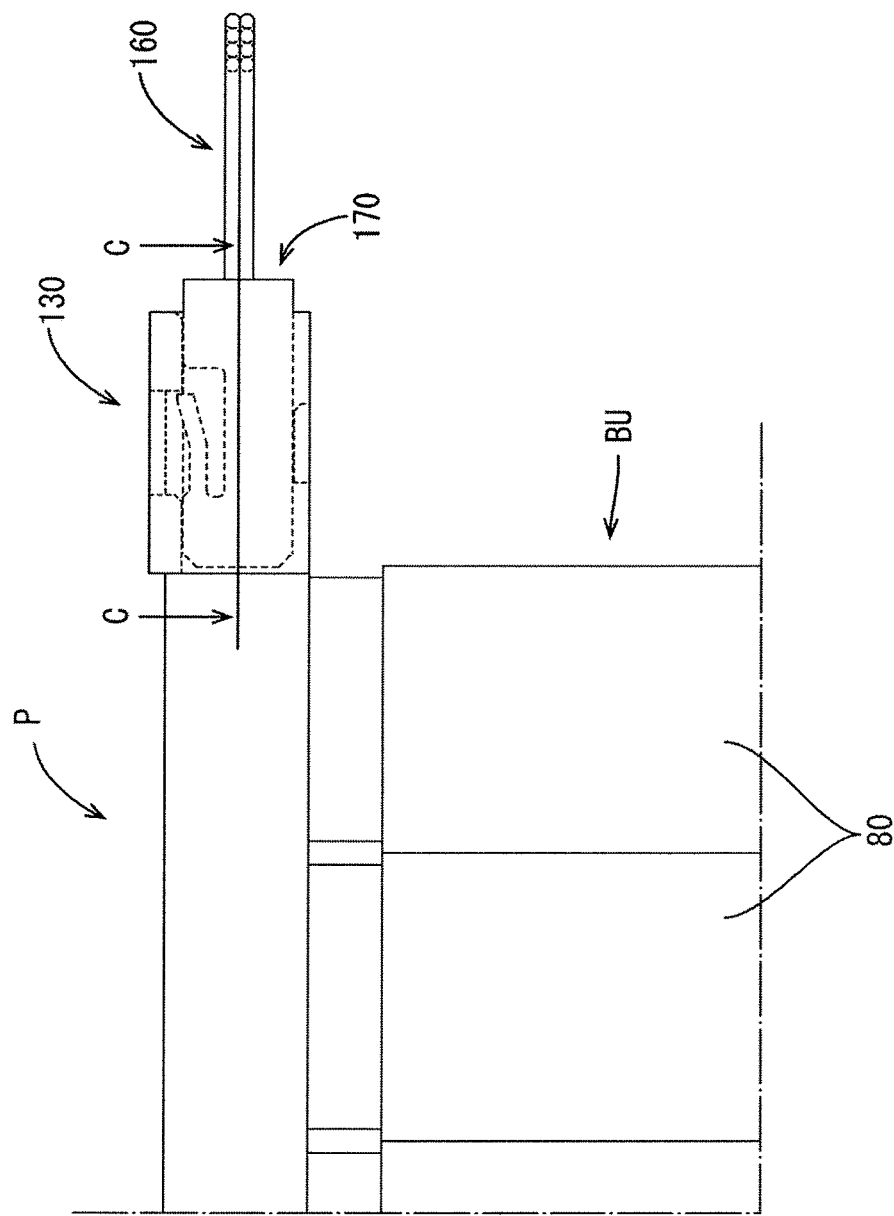
FIG. 11 is a side view showing the wiring module.
Figure 12:
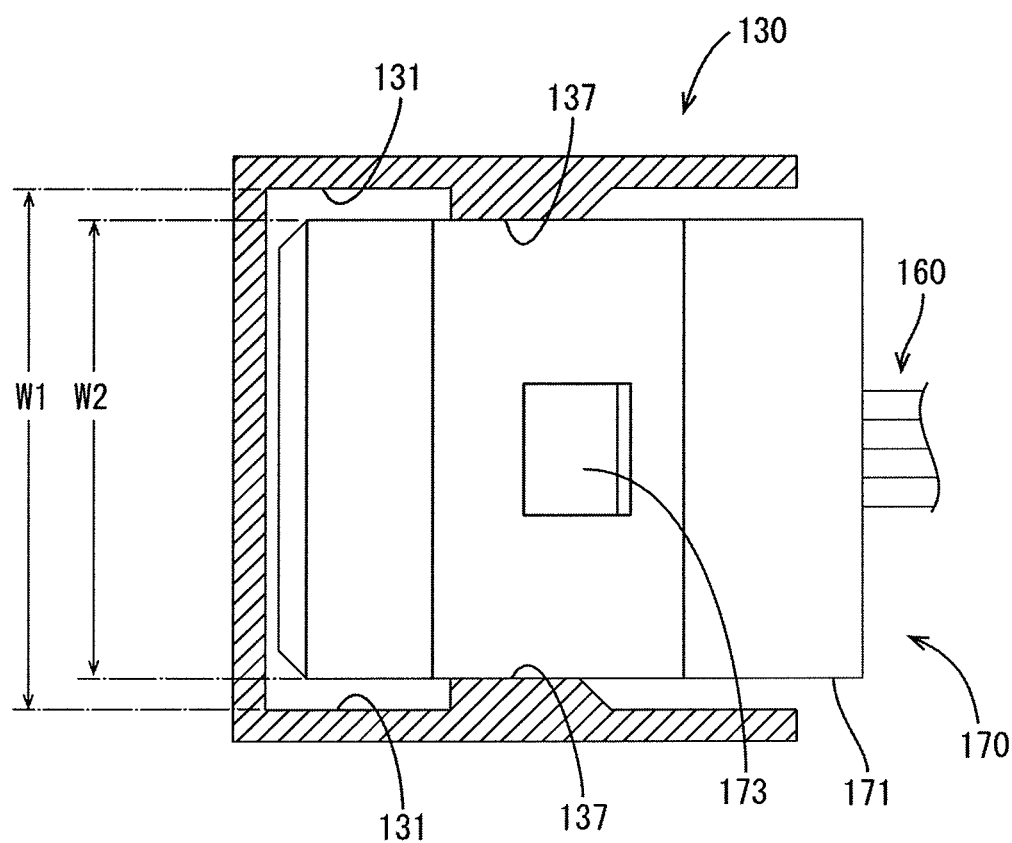
FIG. 12 is a cross-sectional view taken along line C-C in FIG. 11.

As shown in FIGS. 10 and 11, the height H1 of the holding recess 131 is larger than the height H2 of the entire connector 170 including an elastic piece 173, and the height H3 from the lower end of each of the ribs 136 to the upper surface of the support plate portion 135 in a side view is slightly smaller than the height of a housing 171. Moreover, as shown in FIGS. 9 and 12, the dimension W1 of the holding recess 131 in the left-right direction is larger than the dimension of the connector 170 (housing 171) in the left-right direction, and the dimension W2 of a gap between the two protruding wall portions 137 is slightly smaller than the width of the housing 171.

Thus, the connector 170 is pressed against from above and below by the ribs 136 and the support plate portion 135 and sandwiched therebetween with respect to the up-down direction, and is pressed against from left and right by protruding end portions of the respective protruding wall portions 137 and sandwiched therebetween with respect to the left-right direction. Consequently, the connector 170 is held in the connector holder 130 in a state in which it is snugly fitted into the connector holder 130 to such an extent that unintentional disengagement is prevented. At this time, the elastic piece 173 of the connector 170 is accommodated between the ribs 136 in a non-elastically-deformed state with the free end 173B of the elastic piece 173 being disposed below the upper opening 132. Otherwise, the configuration of the present embodiment is the same as that of Embodiment 1, and a description thereof is omitted.

With this configuration, the housing 171 of the connector 170 is pressed against from different directions by the protruding wall portions 137 and the ribs 136, and is thus less likely to come out of the connector holder 130. Moreover, since the elastic piece 173 is accommodated between the ribs 136, which extend in the connector insertion direction, and is therefore pulled out from the holding recess 131 without being bent, there is no concern that the elasticity of the elastic piece will be reduced.

Moreover, if protruding wall portions each have, for example, a shape that is longer in the front-rear direction than in the up-down direction, it is necessary to precisely manage the dimensions over the entire length of the protruding wall portions so that the connector can be fitted into the connector holder 130 by slightly expanding the connector holder 130 and also the protruding wall portions can come into surface contact with the side walls of the connector. In contrast, with the above-described configuration, since the protruding wall portions 137 extending in the up-down direction are provided in a portion of the connector holder 130 with respect to the insertion direction of the connector 170, it is sufficient that merely the dimensions of this portion are precisely managed, and the other portions have a size that can reliably accommodate the connector 170, and therefore, manufacturing is made easier.

Embodiment 3

Figure 13:
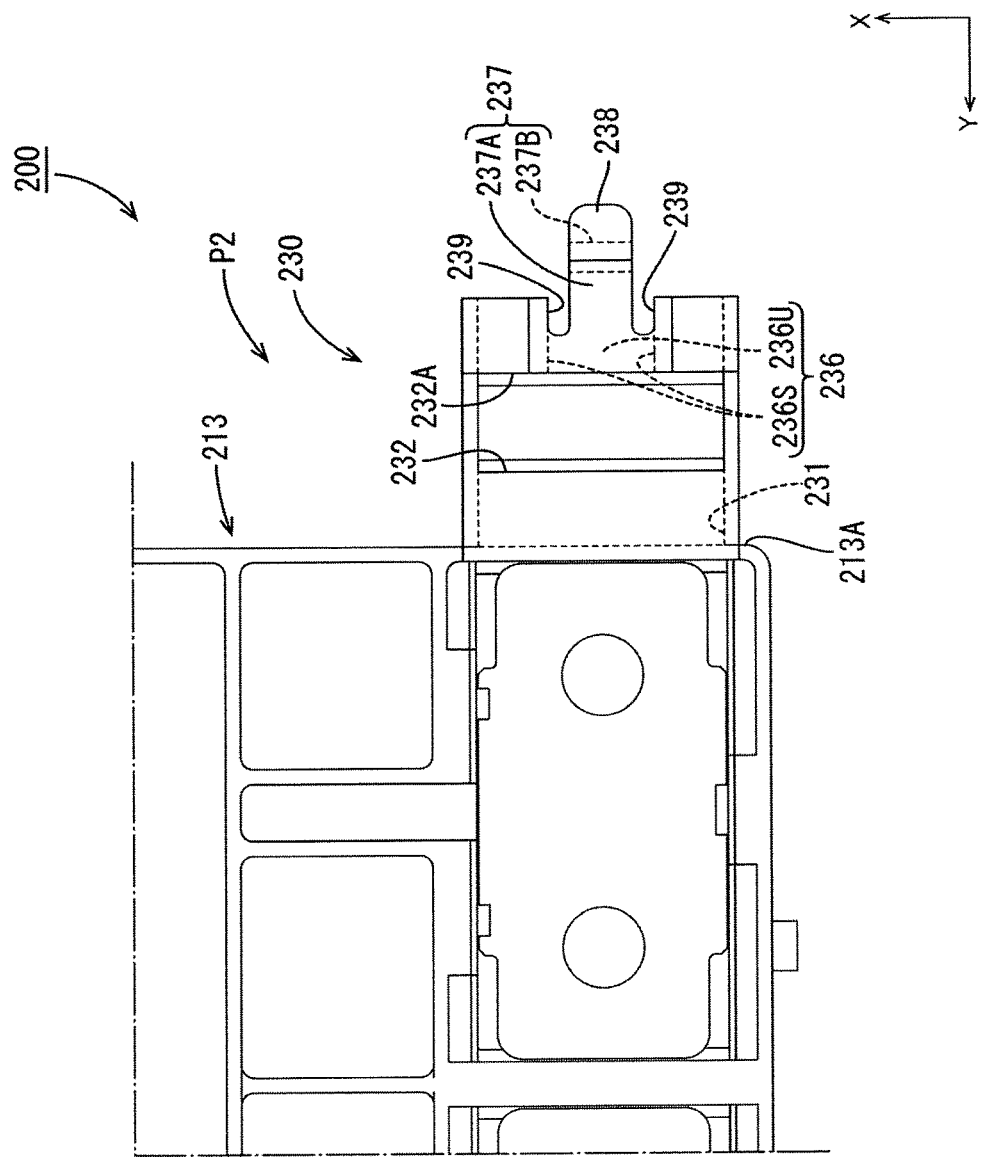
FIG. 13 is a top view showing an insulating protector and a bus bar of Embodiment 3.

Next, Embodiment 3 according to the technology disclosed in the present specification will be described with reference to FIGS. 13 to 15.

In a wiring module 200 of the present embodiment, a connector holder 230 of an insulating protector P2 includes a protruding recess 236, a disengagement preventing tab 237 (an example of a disengagement preventing portion), and a projecting piece 238.

The protruding recess 236 (an example of an escape recess) is formed in a shape in which a center portion of a holding upper surface 231U in the left-right direction that is located rearward of an upper opening 232 is raised up one step. The dimension of the protruding recess 236 in the left-right direction (dimension of a gap between left and right protruding holding side surfaces 236S) is larger than the dimension of an elastic piece 273 of a connector 270 in the left-right direction. Moreover, the height H4 from the lower surface of a protruding upper wall 236U of the protruding recess 236 to the upper surface of a support plate portion 235 in a side view is larger than the height H5 of the entire connector 270 including the elastic piece 273.

Figure 14:
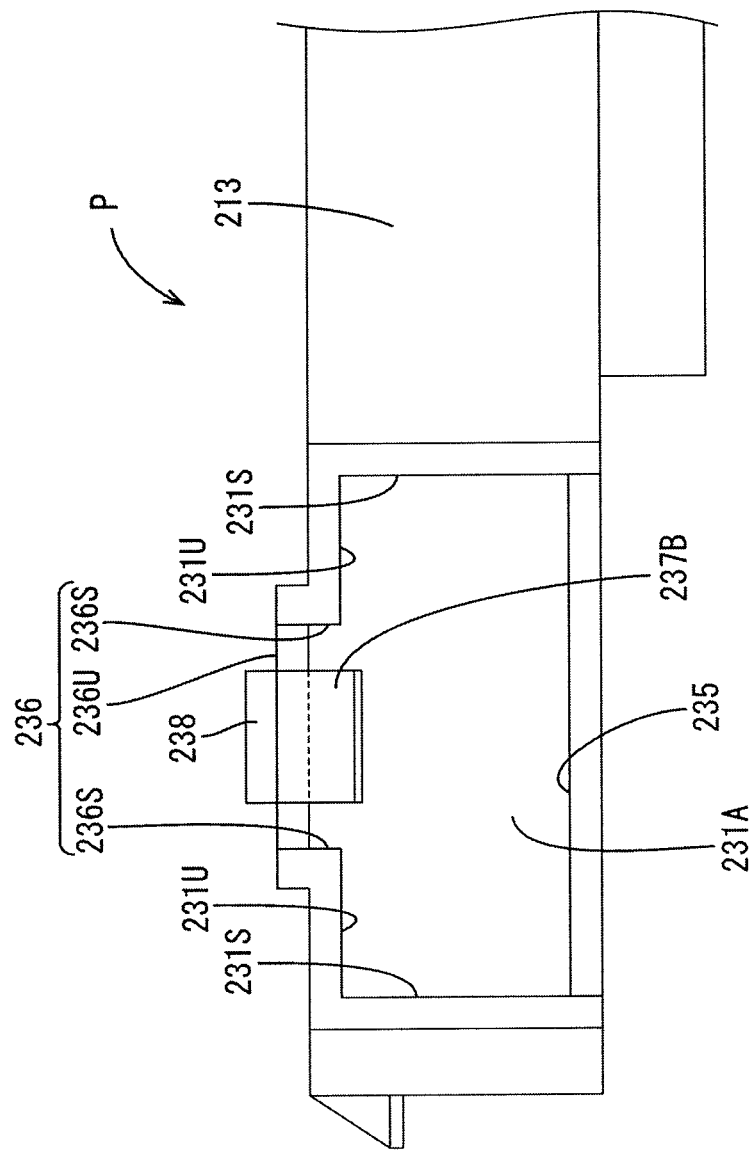
FIG. 14 is a rear view showing the insulating protector.

As shown in FIG. 14, the disengagement preventing tab 237 includes a horizontal extending portion 237A that is formed by a central portion of the protruding upper wall 236U of the protruding recess 236 with respect to the left-right direction extending rearward, and furthermore, a vertical extending portion 237B that is formed by a rear end of the central portion extending downward. An external tapered surface 237C is provided on a front surface (surface that faces the holding recess 231) of the disengagement preventing tab 237, the external tapered surface 237C having a shape that slopes downward toward the rear side. Note that the protruding upper wall 236U has slits 239 that are made on both sides in a base end portion of the horizontal extending portion 237A and have respective shapes extending toward the front side.

The projecting piece 238 has a shape that is formed by the horizontal extending portion 237A of the disengagement preventing tab 237 extending further rearward. A step is formed between the projecting piece 238 and the horizontal extending portion 237A, and the projecting piece 238 is one step higher than the horizontal extending portion 237A.

Figure 15:
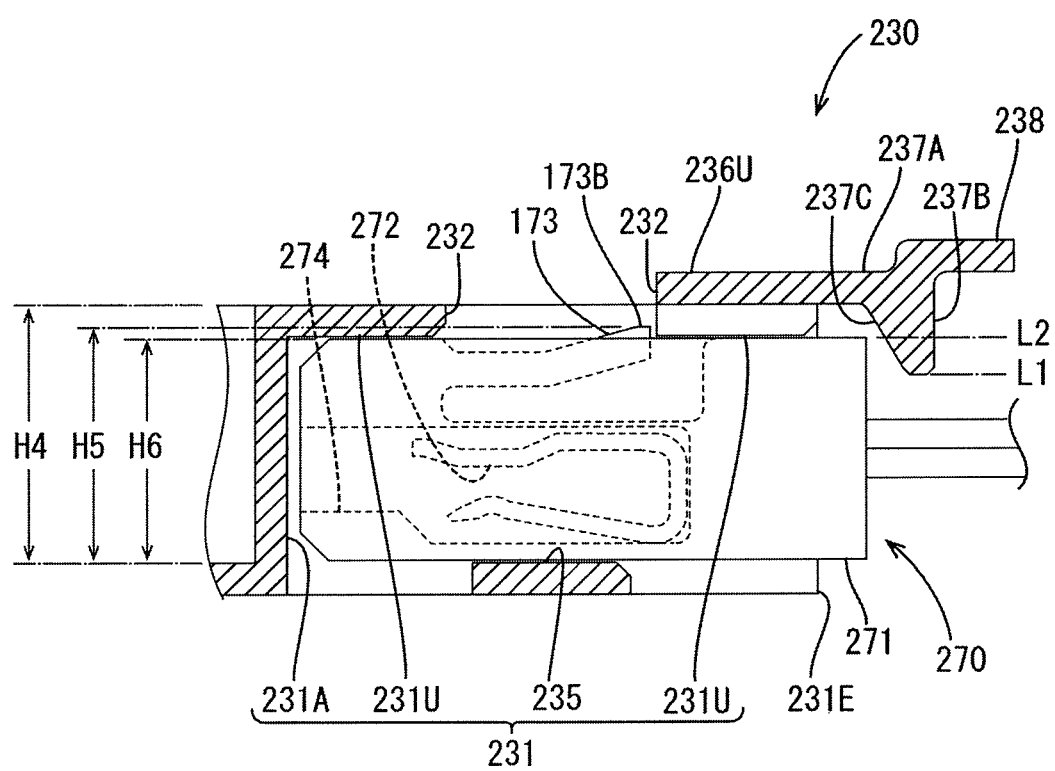
FIG. 15 is a cross-sectional view showing a wiring module.

As shown in FIG. 15, the height H6 from the lower surface of the holding upper surface 231U to the upper surface of the support plate portion 235 in a side view is approximately the same as the height of the housing 271. The height H4 from the lower surface of the protruding upper wall 236U to the support plate portion 235 is larger than the height H5 of the entire connector 70, which is the height of the connector 70 including the elastic piece 73. Moreover, the height level L1 of the lower end of the disengagement preventing tab 237 is lower than the height level L2 of the upper surface of the housing 271.

In order for the connector 270 to be held in the connector holder 230, the lower end of the disengagement preventing tab 237 is pulled up above the height level L2 by holding and elastically displacing the projecting piece 238 upward, and then, the connector 270 is moved into the holding recess 231 from the rear side. Then, the elastic piece 273 passes through the protruding recess 236 without elastically deforming, and is disposed below the upper opening 232. Subsequently, the projecting piece 238 is released, and thus, the disengagement preventing tab 237 elastically returns and is disposed at a position opposing a rear end portion of the housing 271 from the rear side. That is, the disengagement preventing tab 237 is locked to the rear end portion of the connector 270 from the rear side. The connector 270 is thus held in the holding recess 231 in a state in which rearward displacement of the connector 270 is restricted.

In order to detach the connector 270 from the connector holder 230, the lower end of the disengagement preventing tab 237 is pulled up above the height level L2 by holding and elastically displacing the projecting piece 238 upward, to thereby release locking to the connector 270, and then, the connector 270 is pulled out rearward from the holding recess 231. Alternatively, the connector 270 may also be strongly pulled out rearward from the holding recess 231 without pulling the projecting piece 238 up. In this case, while the connector 270 is being pulled out, the rear end of the connector 270 abuts against the external tapered surface 237C of the disengagement preventing tab 237 from the front side and elastically pushes up the lower end of the disengagement preventing tab 237 above the height level L2 to thereby release locking to the connector 270. Otherwise, the configuration of the present embodiment is the same as that of Embodiment 1, and therefore, a description thereof is omitted.

With the above-described configuration, since the elastic piece 273 of the connector 270 can be pulled out from the escape recess 236 without elastically deforming, there is no concern that the elasticity of the elastic piece 273 will be reduced. Moreover, since the disengagement preventing portion 237 is locked to the rear end portion of the connector 270 from the rear side, the connector 270 can be prevented from disengaging from the connector holder 230. Moreover, while pulling out the connector 270 from the connector holder 230, a state in which the connector 270 can be pulled out from the holding recess 231 can be created by operating the projecting piece 238, and therefore, it is easy to perform the pulling-out operation, because even when, for example, the worker wears thick gloves or the like, the worker can operate the projecting piece 238 with thick gloves on.

Modification

Figure 16:
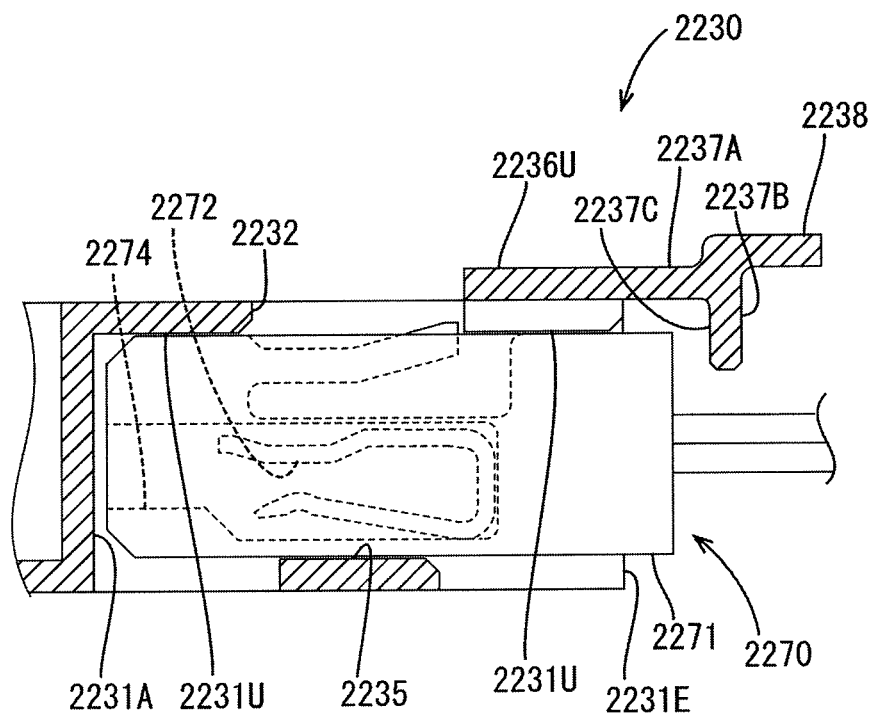
FIG. 16 is a cross-sectional view showing a modification of Embodiment 3.

Next, a modification of Embodiment 3 will be described with reference to FIG. 16. The disengagement preventing tab 237 of Embodiment 3 is provided with the external tapered surface 237C, which has a shape that slopes downward toward the rear side, whereas a disengagement preventing tab 2237 of the present modification does not have an external tapered surface, and a front surface of a vertical extending portion 2237B constitutes a vertical surface 2237C. In a state in which a connector 2270 is accommodated in a holding recess 2231, the vertical surface 2237C is disposed opposing a rear surface of the connector 2270. Otherwise, the configuration of the present modification is the same as that of Embodiment 3, and therefore, a description thereof is omitted.

With this configuration, in order to detach the connector 2270 from the holding recess 2231, it is necessary to first hold and elastically displace a projecting piece 2238 upward before pulling the connector 2270 rearward. Thus, the connector 2270 can be prevented from being unintentionally disengaged from the holding recess 231. That is to say, this configuration is suitable for a case where it is desirable for a connector to be reliably held by a connector holder.

Embodiment 4

Next, Embodiment 4 according to the technology disclosed in the present specification will be described with reference to FIGS. 17 to 21.

Figure 17:
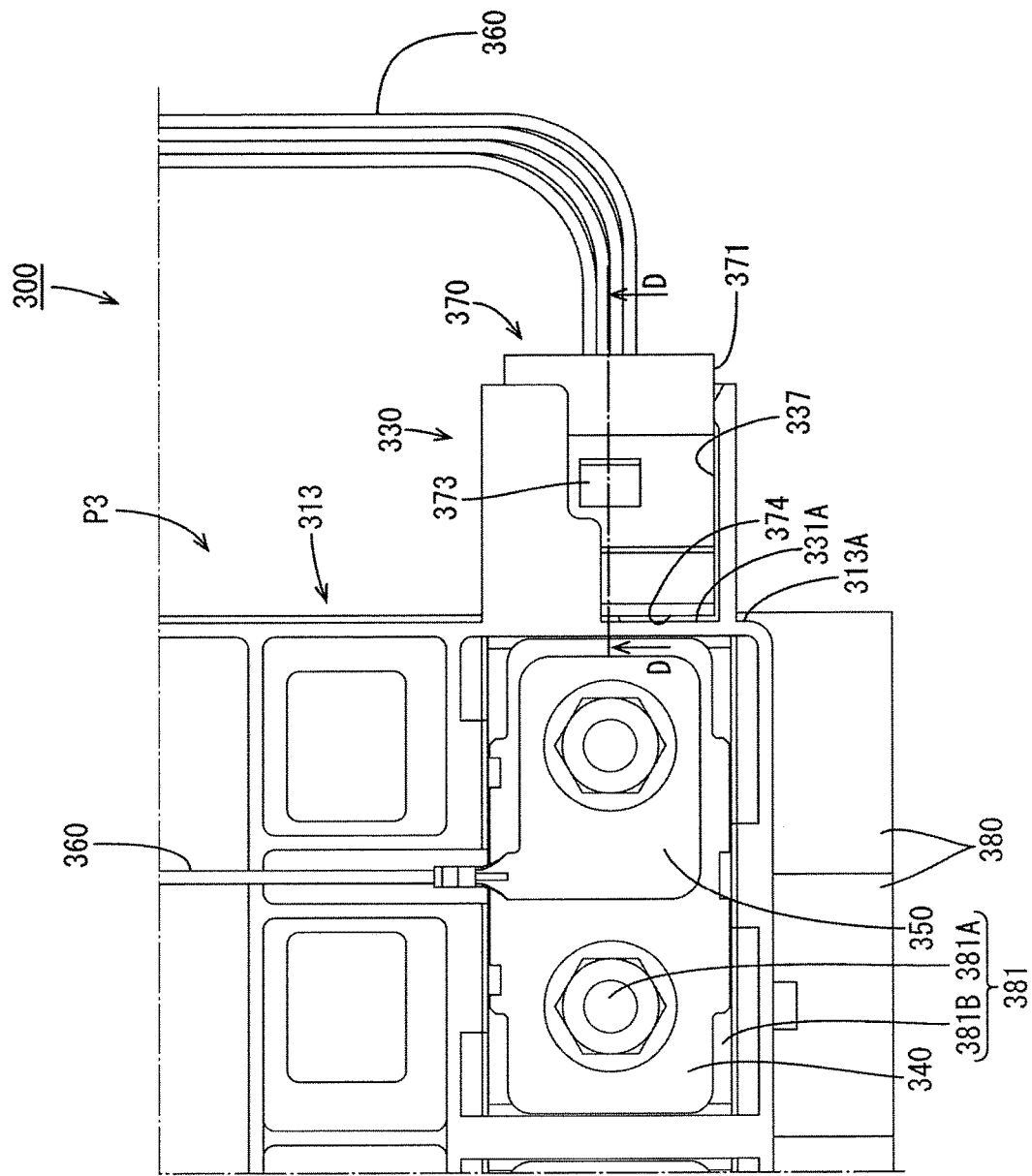
FIG. 17 is a top view showing a wiring module of Embodiment 4.
Figure 18:
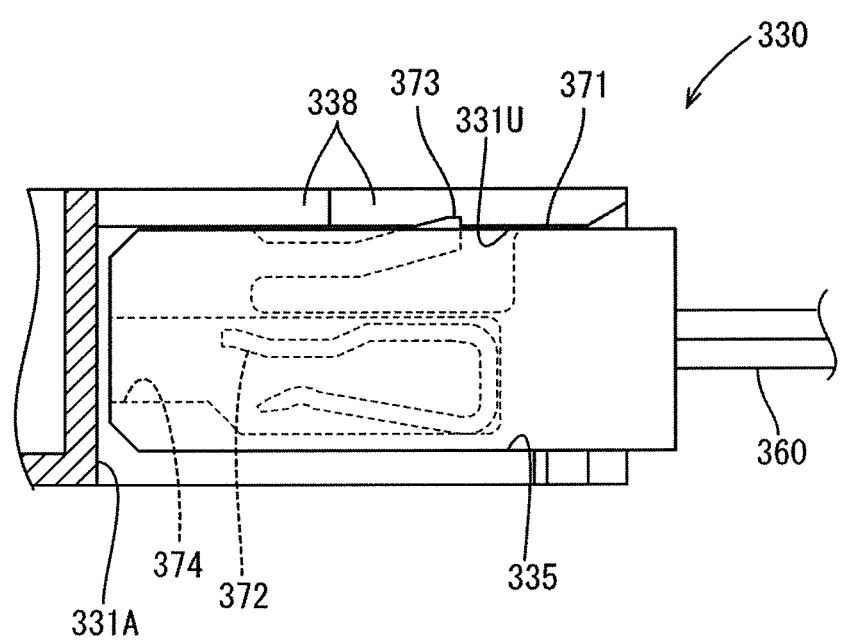
FIG. 18 is a cross-sectional view taken along line D-D in FIG. 17.

In the wiring module 100 of Embodiment 2, the connector holder 130 of the insulating protector P1 includes the pair of protruding wall portions 137, which extend in a direction that is orthogonal to the connector insertion direction, and the pair of ribs 136, which extend in the insertion direction of the connector 170. In contrast, a wiring module 300 of the present embodiment includes an insulating protector P3, and a connector holder 330 of the insulating protector P3 includes, as shown in FIGS. 17 and 18, a pair of protruding wall portions 337 that extend in the direction that is orthogonal to the insertion direction of a connector 370 as well as an escape recess 338 that extends in the insertion direction of the connector 370. Also, a configuration is adopted in which a housing 371 of the connector 370 is pressed against by the protruding wall portions 337 and thereby held by the protruding wall portions 337, and an elastic piece 373 of the connector 370 is allowed to escape upward via the escape recess 338.

Figure 19:
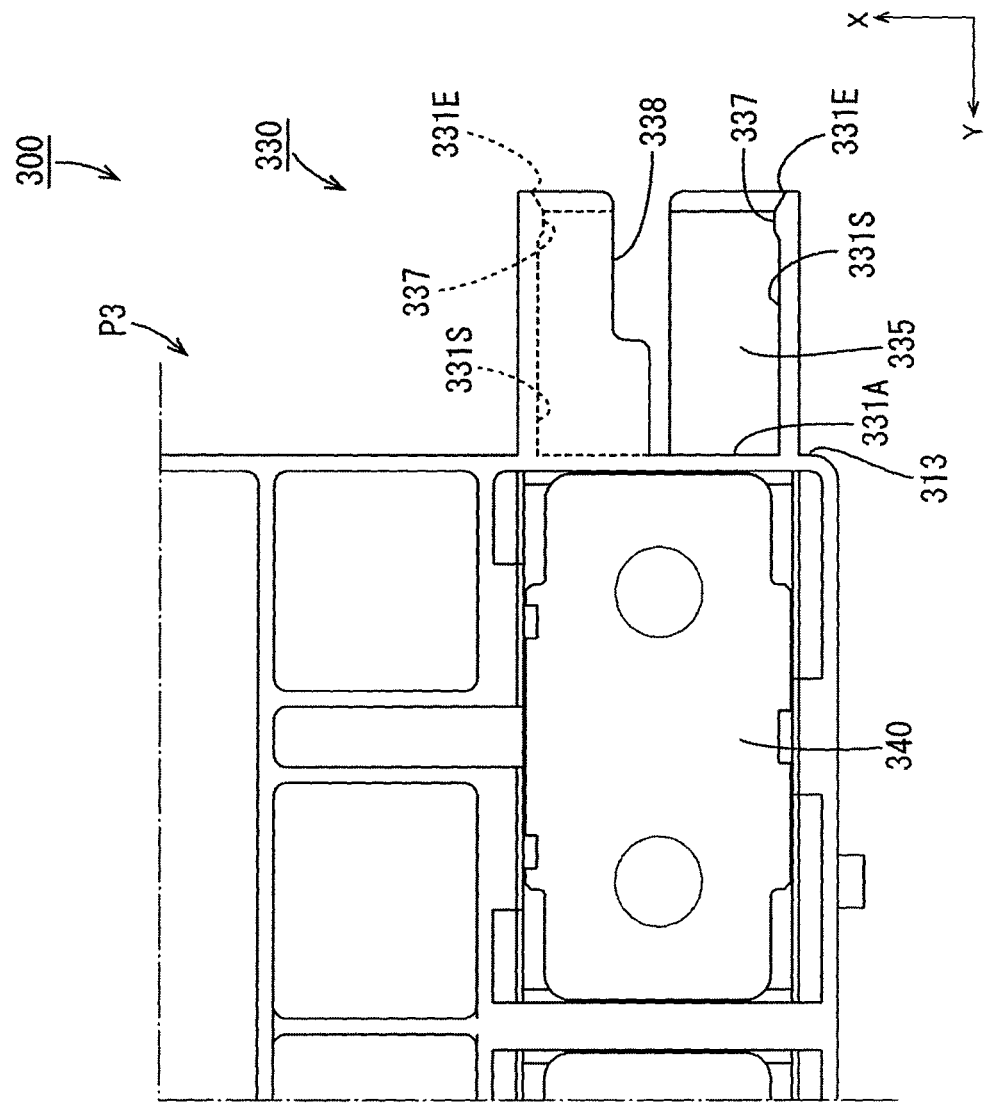
FIG. 19 is a top view showing an insulating protector and a bus bar.

More specifically, as shown in FIGS. 18 and 19, a holding recess 331 of the connector holder 330 includes an upper surface (an example of a holding lower surface) of a support plate portion 335, a pair of holding side surfaces 331S extending upward from respective side edges of the plane of the support plate portion 335 while opposing each other, a holding upper surface 331U that is disposed opposing the holding lower surface, and a receiving port 331E for receiving the connector 370.

As shown in FIGS. 17 and 19, the escape recess 338 is formed into a shape in which the holding upper surface 331U is recessed from the rear end to the front end so as to make substantially the left half of the holding recess 331 and a moving path of the elastic piece 373 of the connector 370 open upward. Moreover, the support plate portion 335 has a die-cut opening 390 that is formed in a shape in which the support plate portion 335 is recessed from the rear end to the front end so as to make substantially the right half of the holding recess 331 open downward. Thus, the upper surface of the support plate portion 335 is exposed to an upper space through the escape recess 338, and the holding upper surface 331U is exposed to a lower space through the die-cut opening.

Each of the protruding wall portions 337 protrudes from the vicinity of a rear end (i.e., vicinity of the receiving port 331E) of a corresponding one of the holding side surfaces 331S toward the inside of the holding recess 331, and has a shape that is longer in the up-down direction than in the front-rear direction.

In order to insert the connector 370 into the connector holder 330, the connector 370 is press-fitted between the protruding wall portions 337 from the rear side. Then, as shown in FIG. 18, the housing 371 is inserted in a state in which the elastic piece 373 escapes upward through the escape recess 338, the entire elastic piece 373 is disposed below the upper surface of the connector holder 330, and the elastic piece 373 is not in contact with the holding recess 331. Then, as shown in FIG. 21, a held state is created in which an insertion opening 374 in which a female terminal 372 is provided opposes a holding inner surface 331A and is thus isolated from an external space, the housing 371 is pressed against from both lateral sides by the protruding wall portions 337 and restricted from being displaced, and the elastic piece 373 escapes upward from the inside of the holding recess 331 through the escape recess 338.

With this configuration, the connector holder 330 is provided with the protruding wall portions 337, and thus the connector is held in the holding recess 331 in a state of being pressed against. Therefore, it is unlikely that the connector will disengage from the holding recess 331. Moreover, the connector holder 330 is provided with the escape recess 338, and the elastic piece 373 of the connector 370 is inserted into the holding recess 331 in a state in which the elastic piece 373 is not in contact with the connector holder 330. Therefore, there is no concern that the elasticity of the elastic piece 373 will be reduced.

Moreover, with the configuration of the present embodiment, the escape recess 338 can function as a release hole for forming the support plate portion 335, in which the protruding wall portions 337, which extend in the up-down direction, are provided on the upper surface side, through die-cutting and can also function as an escape hole during insertion and holding of the elastic piece 373 of the connector 370 in the holding recess 331.

Moreover, during insertion of the connector, the protruding wall portions serve as the points on which a force for expanding and deforming the connector holder is applied, and a base end portion of the connector holder 330 serves as a fulcrum for the expanding deformation. For example, if protruding wall portions are provided on an inner side of a connector holder, the points on which the force is applied are close to the fulcrum, and therefore, a large force is required to insert the connector. In contrast, in the present embodiment, the protruding wall portions 337 are disposed in the vicinity of the receiving port 331E, that is, the points on which the force is applied are spaced apart from the fulcrum. Accordingly, the insertion force of the connector 370 can be suppressed.

Note that although the escape recess 338, in the present embodiment, is provided by making a portion of only the holding upper surface 331U open, the escape recess 338 may also be configured to include a first escape opening portion that is formed by making a portion of the holding upper surface 331U open and a second escape opening portion that is formed by making a portion of the support plate portion 335 open, that is, the escape recess 338 may also be configured to have the same shape in a top view and a bottom view. With this configuration, the connector 370 can be held in the holding recess 331 even if the connector 370 is inverted, and therefore, the time and effort required for the operation of confirming the orientation of the connector 370 in the up-down direction during insertion of the connector 370 into the holding recess 331 can be saved.

Other Embodiments

The technology disclosed in the present specification is not limited to the embodiments that have been described so far with reference to the drawings, and can be implemented in the following forms, for example.

(1) In the foregoing embodiments, a configuration is adopted in which the crimp portions 53 of the detection terminals 50 are connected to the one end 61 side of the detection wires 60, and the detection terminals 50 are laid on top of the respective bus bars 40; however, a configuration may also be adopted in which bus bars are provided with crimp portions, and the detection wires 60 are directly connected to the crimp portions. Moreover, detection wires may also be connected to bus bars through welding, soldering, or brazing.

(2) In the foregoing embodiments, in a state in which the connector 70 is held in the connector holder 30, the opening end portion of the insertion opening 74 is entirely closed by the holding inner surface 31A of the holding recess 31, and thus the insertion opening 74 is isolated from the external space; however, it is not necessarily required that the opening end portion of the insertion opening be entirely closed, and, for example, an air vent hole may also be formed in the holding inner surface.

(3) In the foregoing embodiments, the connector holder 30 protrudes from the rear wall 13 of the terminal fitting accommodating portions 10; however, the connector holder may also protrude from a side surface or a lower surface of the insulating protector.

(4) In the foregoing embodiments, the holding recess includes the holding lower surface, the pair of holding side surfaces, which extend upward from the opposite side edges of the holding lower surface while opposing each other, and the holding upper surface, which is disposed opposing the holding lower surface; however, it is not necessarily required that the holding recess include all of these surfaces, and, for example, a configuration in which any of these surfaces is not included in the holding recess may be adopted, or a configuration in which the holding recess includes none of these surfaces and is formed in, for example, a frame-like shape that can hold the connector may be adopted. In short, it is sufficient that the connector can be detachably held in the holding recess.

(5) In the foregoing embodiments, the detection wires 60 that connect the detection terminals 50 to the connector 70 are described as an example of a wire; however, the wire is not limited to such detection wires. For example, the wire may be a thermistor wire for connecting a thermistor and a connector to each other, or may be a power supply wire for outputting the power from each power storage element to the outside.

(6) In the foregoing embodiments, a configuration is adopted in which the connector holder 30 is provided at the end portion 13A of the single wall portion 13 of the insulating protector P that is away from the wire outlet port; however, the position at which the connector holder is provided is not limited to this, and, for example, the connector holder may also be provided adjacent to the wire outlet port. With this configuration, since the connector holder is adjacent to the wire outlet port, the bend radius of the wires extending from the wire outlet port and bent toward the connector holder can be reduced. Accordingly, the area occupied by the wires outside the insulating protector can be reduced, and thus, space can be saved. Alternatively, the connector holder may be provided in an intermediate region between the wire outlet port and the end portion that is away from the wire outlet port, of the single wall portion of the insulating protector. In short, an appropriate position can be selected taking into account the desired ease of insertion of the connector into the connector holder and the area that can be occupied by the wires.

(7) In the foregoing embodiments, a closing surface for isolating the insertion opening from the external space is provided on the rear surface of the insulating protector, and the connector insertion direction is set in the direction Y; however, the position of the closing surface is not limited to this, and, for example, the closing surface may be provided on a side surface (surface that is orthogonal to the direction Y) of the connector holder, or may not be provided. Moreover, the connector insertion direction may also be set in the direction X or the direction Z.

In the foregoing embodiments, a configuration is adopted in which the protruding wall portions, which extend in the direction that crosses the connector insertion direction, are provided in the connector holder to press against the connector; however, instead of this configuration, for example, a protruding wall portion extending in the connector insertion direction may also be provided, or a configuration may also be adopted in which no protruding wall portion is provided, an entire holding side surface of the connector holder serves as a pressing wall portion, and the connector is pressed against by a portion or the entirety of the pressing wall portion.

LIST OF REFERENCE NUMERALS

1: Wiring Module
BU: Power Storage Element Group
60: Wire
80: Power Storage Element
P: Insulating Protector
10: Terminal Fitting Accommodating Portion
20: Wire Accommodating Portion
21: Wire Outlet Port
30: Connector Holder
31: Holding Recess (Connector Holder)
31E: Receiving Port
40: Bus Bar
50: Detection Terminal
60: Detection Wire
70: Connector
72: Female Terminal
73: Elastic Piece
74: Insertion Opening
136: Rib
137, 337: Protruding Wall Portion
236: Protruding Recess (Escape Recess)
237: Disengagement Preventing Tab
238: Projecting Piece
331S: Holding Side Surface
331U: Holding Upper Surface
331E: Receiving Port
335: Support Plate Portion (Holding Lower Surface)
336: Escape Recess

What is claimed is:

1. A wiring module configured to be attached to a power storage element group in which a plurality of power storage elements are lined up, the wiring module comprising:
a bus bar to electrically connect the plurality of power storage elements together;
an insulating protector that accommodates the bus bar and is configured to be mounted onto the power storage element group;
a wire that extends from a side of the bus bar to an outside of the insulating protector;
a connector provided at an extending end of the wire, the extending end extending from the insulating protector; and
a connector holder provided in the insulating protector and configured to detachably hold the connector.

2. The wiring module according to claim 1,
wherein the connector includes an elastic piece that is flexible in a direction that crosses an insertion direction of the connector, and
the connector holder includes a holding opening in which the elastic piece is held when the connector is held in the connector holder, and an internal tapered surface that is contiguous with the holding opening and that slides against the elastic piece and bends the elastic piece as the connector is removed from the connector holder.

3. The wiring module according to claim 1,
wherein the connector holder includes a protruding wall, the protruding wall protruding in a direction that crosses an insertion direction of the connector, and a protruding end of the protruding wall being configured to press against the connector.

4. The wiring module according to claim 1,
wherein the connector holder includes:
a disengagement preventing lock to be locked to a rear end of the connector inserted into the connector holder, from a rear side to thereby prevent the connector from disengaging from the connector holder; and
a projection that is contiguous with the disengagement preventing lock and is configured to release a locking caused by the disengagement preventing lock.

5. The wiring module according to claim 3,
wherein the protruding wall is provided in a portion of the connector holder with respect to the insertion direction of the connector.

6. The wiring module according to claim 5,
wherein the connector holder includes a receiving port to receive the connector, and
the protruding wall is disposed in a vicinity of the receiving port.

7. The wiring module according to claim 1,
wherein the insulating protector has a wire outlet port through which the wire extends to the outside, the wire outlet port being formed in a single wall of the insulating protector, and
the connector holder is provided at an end of the single wall that is away from the wire outlet port.

8. The wiring module according to claim 1,
wherein the insulating protector has a wire outlet port through which the wire extends to the outside, and
the connector holder is provided adjacent to the wire outlet port.

9. The wiring module according to claim 1,
wherein the connector includes an insertion opening into which a mating terminal is to be inserted and a terminal that is provided inside the insertion opening, and
the connector holder isolates the insertion opening from an external space.

10. The wiring module according to claim 1,
wherein, when a direction in which the connector is inserted into the connector holder is defined as an insertion direction, the wire is led out from the connector in a direction opposite to the insertion direction.

11. The wiring module according to claim 1,
wherein, when a direction in which the connector is inserted into the connector holder is defined as an insertion direction, the insertion direction crosses a direction in which the insulating protector is separated from the power storage element group.

12. The wiring module according to claim 1,
wherein the connector is configured to be not connectable with a mating connector of an external device when the connector holder is holding the connector, and the connector is configured to be connectable with the mating connector of the external device when the connector holder is not holding the connector.

13. A wiring module configured to be attached to a power storage element group in which a plurality of power storage elements are lined up, the wiring module comprising:
a bus bar to electrically connect the plurality of power storage elements together;
an insulating protector that accommodates the bus bar and is configured to be mounted onto the power storage element group;
a wire that extends from a side of the bus bar to an outside of the insulating protector;
a connector provided at an extending end portion of the wire, the extending end portion extending from the insulating protector; and
a connector holder provided in the insulating protector and configured to detachably hold the connector, wherein the connector holder includes:

a disengagement preventing portion to be locked to a rear end portion of the connector inserted into the connector holder, from a rear side to thereby prevent the connector from disengaging from the connector holder; and a projecting piece that is contiguous with the disengagement preventing portion and with which a locking caused by the disengagement preventing portion can be released.

* * * * *